United States Patent
Tachibana et al.

(10) Patent No.: US 8,629,643 B2
(45) Date of Patent: Jan. 14, 2014

(54) IMAGE FORMING APPARATUS HAVING STEPPING MOTOR ARRANGED IN CONVEYING PATH FOR PAPER, AND METHOD FOR CONTROLLING STEPPING MOTOR IN IMAGE FORMING APPARATUS

(75) Inventors: Yuta Tachibana, Toyokawa (JP); Tomonobu Tamura, Toyokawa (JP); Hiroyuki Watanabe, Toyokawa (JP); Norihiko Nakano, Hoi-gun (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 320 days.

(21) Appl. No.: 13/044,315

(22) Filed: Mar. 9, 2011

(65) Prior Publication Data
US 2011/0229235 A1   Sep. 22, 2011

(30) Foreign Application Priority Data
Mar. 18, 2010   (JP) .................................. 2010-062018

(51) Int. Cl.
*H02P 8/00*   (2006.01)
*H02P 8/14*   (2006.01)

(52) U.S. Cl.
CPC ........................................ *H02P 8/14* (2013.01)
USPC ........................ 318/696; 318/400.42; 318/700

(58) Field of Classification Search
CPC ............................................................ H02P 8/14
USPC ...................................... 318/696, 400.42, 700
See application file for complete search history.

(56) References Cited

U.S. PATENT DOCUMENTS

| | | | |
|---|---|---|---|
| 5,424,960 A | 6/1995 | Watanabe et al. | |
| 5,844,387 A * | 12/1998 | Mukai et al. | 318/432 |
| 6,911,800 B2 * | 6/2005 | Kobayashi et al. | 318/685 |
| 7,615,961 B2 * | 11/2009 | Kobayashi et al. | 318/685 |
| 7,837,194 B2 * | 11/2010 | Terada | 271/266 |
| 2002/0039012 A1 | 4/2002 | Matsuda et al. | |
| 2004/0113581 A1 | 6/2004 | Kobayashi et al. | |

FOREIGN PATENT DOCUMENTS

| | | |
|---|---|---|
| JP | 61-142996 | 6/1986 |
| JP | 6-43050 | 2/1994 |
| JP | 6-133593 | 5/1994 |
| JP | 7-337093 | 12/1995 |

(Continued)

OTHER PUBLICATIONS

Decision to Grant Patent mailed Jan. 17, 2012, directed to Japanese Application No. 2010-062018; 6 pages.

*Primary Examiner* — Bentsu Ro
*Assistant Examiner* — David Luo
(74) *Attorney, Agent, or Firm* — Morrison & Foerster LLP

(57) ABSTRACT

An image forming apparatus includes: a stepping motor arranged in a conveying path for a paper; a driver for driving the stepping motor; a current detecting unit for detecting an actual current value; and a control unit for providing a set current value for every predetermined cycle. The control unit determines an estimated load torque value corresponding to the set current value in a previous cycle and the actual current value in a present cycle, by referring to a relationship between actual current and load torque of the stepping motor with respect to the set current value, determines a target load torque value based on the estimated load torque value, and determines, as the set current value, a current value corresponding to the target load torque value, by referring to a relationship between maximum output torque of the stepping motor and current supplied to the stepping motor.

23 Claims, 20 Drawing Sheets

(56) References Cited

FOREIGN PATENT DOCUMENTS

| JP | 2000-341994 | 12/2000 |
|----|-------------|---------|
| JP | 2001-231296 | 8/2001 |
| JP | 2001-262938 | 9/2001 |
| JP | 2002-10689 | 1/2002 |
| JP | 2002-64996 | 2/2002 |
| JP | 2004-104888 | 4/2004 |
| JP | 2006-333598 | 12/2006 |
| JP | 2010-28949 | 2/2010 |

* cited by examiner

IMAGE FORMING APPARATUS HAVING STEPPING MOTOR ARRANGED IN CONVEYING PATH FOR PAPER, AND METHOD FOR CONTROLLING STEPPING MOTOR IN IMAGE FORMING APPARATUS

This application is based on Japanese Patent Application No. 2010-062018 filed with the Japan Patent Office on Mar. 18, 2010, the entire content of which is hereby incorporated by reference.

BACKGROUND OF THE INVENTION

1. Field of the Invention

The present invention relates to an image forming apparatus having a stepping motor arranged in a conveying path for a paper, and a method for controlling the stepping motor in the image forming apparatus.

2. Description of the Related Art

Conventionally, in an image forming apparatus such as a printer and a complex machine, a stepping motor has often been employed as means for conveying a paper. This is because there is an advantage that the stepping motor allows so-called open-loop positional control that does not require a rotation sensor and the like. Although the stepping motor allows this open-loop positional control, a phenomenon of step-out occurs when load torque exceeding maximum output torque is applied even for a moment, and the stepping motor stops. Therefore, the stepping motor must be controlled to prevent this step-out.

Therefore, in the stepping motor used for paper conveyance in the image forming apparatus, for example, peak load torque is assumed in advance in consideration of variations in apparatus, the environmental temperature and the durability of the apparatus. A method for preventing the step-out by setting the magnitude of a drive current supplied to the stepping motor such that the maximum output torque having a predetermined margin can be achieved with respect to the assumed peak load torque has been generally employed.

The following techniques have been known as the foregoing method for driving the stepping motor while preventing the step-out.

Japanese Laid-Open Patent Publication No. 2001-262938 discloses a configuration including a stepping motor to which a positional sensor is added, in which a motor drive current is made variable in accordance with an amount of deviation between a command pulse and an amount of motor movement.

Japanese Laid-Open Patent Publication No. 06-133593 discloses a configuration in which control is performed over the speed of a stepping motor based on a difference between a load current in the middle of the rising time and the falling time of an applied pulse and a load current immediately before the falling time.

Japanese Laid-Open Patent Publication No. 2000-341994 discloses a configuration in which a step transition state of a rotor of a stepping motor is detected using a change in inclination of an excitation current, and a preset chopping constant current value corresponding to a maximum load of an apparatus is reduced to supplied excitation current.

Japanese Laid-Open Patent Publication No. 2002-010689 discloses a configuration in which the rising time of a drive current waveform of a pulse motor is changed depending on necessary torque by monitoring a drive current for every step by a current detecting circuit and changing a drive voltage by a variable power supply such that a necessary and sufficient current flows constantly.

Japanese Laid-Open Patent Publication No. 2002-064996 discloses a configuration in which it is determined whether or not a stepping motor is rotating normally at present, whether or not there is a risk of step-out, and the like by detecting a change in drive current of the stepping motor, determining a load and producing a signal.

Japanese Laid-Open Patent Publication No. 2004-104888 discloses a configuration in which, when an amount of operation of a stepping motor is equal to or larger than a set value, a target current value provided to a driver is sequentially changed and a critical step-out target current value of the motor is searched for.

However, the above-described conventional method for controlling the stepping motor and the above patent documents have the following problems.

When the drive current of the magnitude corresponding to the peak load torque assumed in advance is set as in the above-described conventional control method, more torque than necessary is produced and the efficiency is decreased as compared with other conveying means such as a DC brushless motor. In addition, since the current supplied to the stepping motor increases in consideration of a certain level of margin, the temperature of the stepping motor and the driver (in particular, a switching element therein) driving the stepping motor rises greatly and the rated size must be increased or a cooling measure must be taken in order to enhance the heat resistance. Furthermore, vibration occurs due to excessive torque at the time of light load and the like, and it is difficult to handle load fluctuations when an unexpected paper is used, for example.

In addition, in the control method disclosed in Japanese Laid-Open Patent Publication No. 2001-262938, the positional sensor is required for the stepping motor, and thus, the original advantage that the open-loop positional control is possible is lost. In addition, a high-speed processor for constantly monitoring the deviation and controlling excitation is required, which may cause a problem of an increase in cost.

In addition, in the control method disclosed in Japanese Laid-Open Patent Publication No. 06-133593, the rotation speed of the stepping motor changes, and thus, this method is not suitable for a configuration in which a paper is conveyed at a predetermined conveyance speed like the image forming apparatus. In addition, a control computation must be performed in a cycle comparable to a pulse rate (approximately several kilohertz to tens of kilohertz), which may cause a problem of an increase in cost. Furthermore, it is difficult to apply this method to a stepping motor of an excitation type other than 1-2 phase excitation.

In addition, in the control method disclosed in Japanese Laid-Open Patent Publication No. 2000-341994, the control computation must be performed in a cycle sufficiently shorter than the pulse rate, which may cause a problem of an increase in cost due to the processor.

In addition, in the control method disclosed in Japanese Laid-Open Patent Publication No. 2002-010689, a power supply voltage itself must be controlled and a relatively expensive power supply device (regulator) or the like is required, which may cause a problem of an increase in cost.

In addition, in the control method disclosed in Japanese Laid-Open Patent Publication No. 2002-064996, the control computation must be performed in the cycle comparable to the pulse rate, which may cause a problem of an increase in cost.

In addition, in the control method disclosed in Japanese Laid-Open Patent Publication No. 2004-104888, instantaneous load fluctuations cannot be handled.

SUMMARY OF THE INVENTION

The present invention has been made to solve the problems as described above and an object of the present invention is to provide an image forming apparatus that allows setting of a current supplied to a stepping motor to the appropriate magnitude in accordance with actually required load torque, and a method for controlling the stepping motor in the image forming apparatus.

An image forming apparatus according to an aspect of the present invention includes: a stepping motor arranged in a conveying path for a paper on which an image is formed; a driver for driving the stepping motor; a current detecting unit for detecting an actual current value that is magnitude of a current at the driver for driving the stepping motor; and a control unit for providing, to the driver, a set current value for setting magnitude of a current to be supplied to the stepping motor, for every predetermined cycle, based on the actual current value. The control unit includes a first determining portion for determining, as an estimated load torque value, a load torque value corresponding to the set current value in a previous cycle and the actual current value in a present cycle, by referring to a relationship between actual current and load torque of the stepping motor with respect to the set current value, a second determining portion for determining a target load torque value that indicates torque to be output by the stepping motor, based on the estimated load torque value, and a third determining portion for determining, as the set current value, a current value corresponding to the target load torque value, by referring to a relationship between maximum output torque of the stepping motor and current supplied to the stepping motor.

Preferably, the second determining portion is adapted to determine the target load torque value such that a ratio of the target load torque value to the estimated load torque value exceeds 1.

More preferably, the second determining portion is adapted to set the ratio of the target load torque value to the estimated load torque value to be large in advance in continuous image forming processing and then to reduce the ratio as image forming processing proceeds.

Preferably, the control unit further includes a changing portion for changing a set value of a rotation speed of the stepping motor, in accordance with progress of image forming processing.

More preferably, the control unit further includes an obtaining portion for dividing a time period of the image forming processing into a plurality of cycles and obtaining, as the actual current value, a representative value in each cycle from among a plurality of the current values at the driver for driving the stepping motor.

More preferably, the control unit is adapted to use a temporal change in load torque estimated based on the actual current value obtained in previous image forming processing, to determine the target load torque value in each image forming processing.

More preferably, the control unit further includes a fourth determining portion for determining the temporal change in the estimated load torque in each image forming processing by statistical processing of temporal changes in a plurality of load torque that are estimated in a plurality of times of previous image forming processing.

Preferably, the image forming apparatus further includes at least one peak hold circuit provided on an output side of the current detecting unit. The control unit is adapted to output a reset signal to the peak hold circuit at a boundary timing of each cycle.

Preferably, the control unit further includes a storage unit for storing a plurality of relationships between the actual current and the output torque of the stepping motor for a plurality of the set current values of different magnitude, and a fifth determining portion for determining a relationship between the actual current and the output torque of the stepping motor with respect to the set current value in the previous cycle, using two or more the relationships related to the set current value in the previous cycle, of the plurality of relationships between the actual current and the output torque of the stepping motor.

Preferably, the control unit further includes a providing portion for providing a set value of a rotation speed of the stepping motor to the driver, a storage unit for storing a plurality of relationships between the rotation speed of the stepping motor and the maximum output torque of the stepping motor for a plurality of the set current values of different magnitude, and a sixth determining portion for determining the relationship between the maximum output torque of the stepping motor and the current supplied to the stepping motor with respect to the set value of the rotation speed provided to the stepping motor, by obtaining the maximum output torque of the stepping motor corresponding to the set value of the rotation speed provided to the stepping motor, based on the plurality of relationships between the rotation speed of the stepping motor and the maximum output torque of the stepping motor.

Preferably, the current detecting unit includes a low pass filter for filtering a high-frequency component included in a raw detected current.

An image forming apparatus according to another aspect of the present invention has: a stepping motor; a driver for driving the stepping motor; a current detecting unit for detecting an actual current value that is magnitude of a current at the driver for driving the stepping motor; and a control unit for providing, to the driver, a set current value for setting magnitude of a current to be supplied to the stepping motor, for every predetermined cycle, based on the actual current value. The control unit includes a first determining portion for determining, as an estimated load torque value, a load torque value corresponding to the set current value in a previous cycle and the actual current value in a present cycle, by referring to a relationship between actual current and load torque of the stepping motor with respect to the set current value, a second determining portion for determining a target load torque value that indicates torque to be output by the stepping motor, based on the estimated load torque value, and a third determining portion for determining, as the set current value, a current value corresponding to the target load torque value, by referring to a relationship between maximum output torque of the stepping motor and current supplied to the stepping motor.

Preferably, the control unit further includes a storage unit for storing a plurality of relationships between the actual current and the output torque of the stepping motor for a plurality of the set current values of different magnitude, and a fourth determining portion for determining a relationship between the actual current and the output torque of the stepping motor with respect to the set current value in the previous cycle, using two or more the relationships related to the set current value in the previous cycle, of the plurality of relationships between the actual current and the output torque of the stepping motor.

Preferably, the control unit further includes a providing portion for providing a set value of a rotation speed of the stepping motor to the driver, a storage unit for storing a plurality of relationships between the rotation speed of the stepping motor and the maximum output torque of the stepping motor for a plurality of the set current values of different magnitude, and a fifth determining portion for determining the relationship between the maximum output torque of the stepping motor and the current supplied to the stepping motor with respect to the set value of the rotation speed provided to the stepping motor, by obtaining the maximum output torque of the stepping motor corresponding to the set value of the rotation speed provided to the stepping motor, based on the plurality of relationships between the rotation speed of the stepping motor and the maximum output torque of the stepping motor.

Preferably, the current detecting unit includes a low pass filter for filtering a high-frequency component included in a raw detected current.

Preferably, the second determining portion is adapted to determine the target load torque value such that a ratio of the target load torque value to the estimated load torque value exceeds 1.

More preferably, the second determining portion is adapted to set the ratio of the target load torque value to the estimated load torque value to be large in advance in continuous image forming processing and then to reduce the ratio as image forming processing proceeds.

Preferably, the stepping motor is arranged in a conveying path for a paper on which an image is formed, and the control unit further includes a changing portion for changing a set value of a rotation speed of the stepping motor, in accordance with progress of image forming processing.

Preferably, the control unit further includes an obtaining portion for dividing a time period of the image forming processing into a plurality of cycles and obtaining, as the actual current value, a representative value in each cycle from among a plurality of the current values at the driver for driving the stepping motor.

More preferably, the control unit is adapted to use a temporal change in load torque estimated based on the actual current value obtained in previous image forming processing, to determine the target load torque value in each image forming processing.

More preferably, the control unit further includes a sixth determining portion for determining the temporal change in the estimated load torque in each image forming processing by statistical processing of temporal changes in a plurality of load torque that are estimated in a plurality of times of previous image forming processing.

More preferably, the image forming apparatus further includes at least one peak hold circuit provided on an output side of the current detecting unit, wherein the control unit is adapted to output a reset signal to the peak hold circuit at a boundary timing of each cycle.

According to still another aspect of the present invention, there is provided a method for controlling a stepping motor in an image forming apparatus. The control method includes the steps of: detecting an actual current value that is magnitude of a current at a driver for driving the stepping motor; and providing, to the driver, a set current value for setting magnitude of a current to be supplied to the stepping motor, for every predetermined cycle, based on the detected actual current value. The step of providing the set current value for every predetermined cycle includes the steps of determining, as an estimated load torque value, a load torque value corresponding to the set current value in a previous cycle and the actual current value in a present cycle, by referring to a relationship between actual current and load torque of the stepping motor with respect to the set current value, determining a target load torque value that indicates torque to be output by the stepping motor, based on the estimated load torque value, and determining, as the set current value, a current value corresponding to the target load torque value, by referring to a relationship between maximum output torque of the stepping motor and current supplied to the stepping motor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
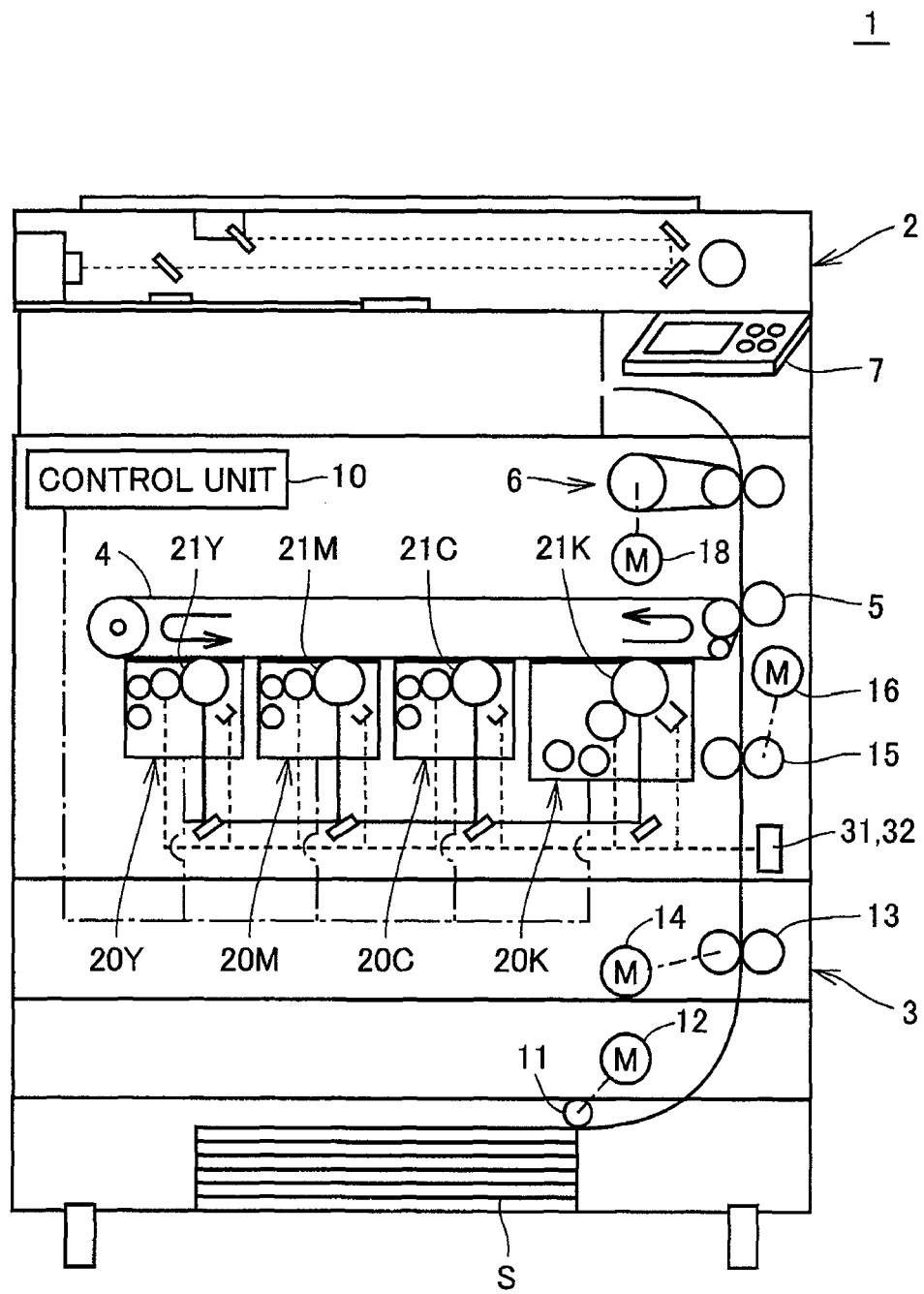
FIG. 1 is a schematic configuration diagram of an image forming apparatus according to a first embodiment of the present invention.

Embodiments of the present invention will be described in detail with reference to the drawings, in which the same or corresponding portions are denoted with the same reference characters and description thereof will not be repeated.

First Embodiment

<Configuration of Apparatus>

Referring to FIG. 1, an image forming apparatus 1 according to the present embodiment includes a scanner 2 for reading image information from a document and producing image data, a print engine 3 capable of print processing, and a control unit 10 for overall control.

A light source emits light to a document put on a platen glass and an imaging element and the like receives the light reflected from the document, and thereby scanner 2 reads image information on the document. Scanner 2 may alternatively include a document feeding tray, a delivery roller, a resist roller, a conveying drum, and an output tray and the like so as to allow continuous document reading.

Print engine 3 executes print processing onto a paper S based on image data such as a print job received from a personal computer and/or image data read by scanner 2. Although FIG. 1 typically depicts a configuration of a tandem-type color electrophotography system, any print configurations such as a monochrome electrophotography system, a four-cycle-type color electrophotography system, an ink jet system, and a thermal print system can be employed.

More specifically, print engine 3 includes four imaging units (image creating units) 20Y, 20M, 20C, and 20K that form toner images of yellow (Y), magenta (M), cyan (C), and black (K), respectively. Imaging units 20Y, 20M, 20C, and 20K are arranged in this order in a direction in which a transfer belt 4 moves. Each imaging unit 20 sequentially forms a toner image of each color on this transfer belt 4 at a synchronized timing. Transfer belt 4 is an image carrying body holding the toner image on a surface thereof, and when this transfer belt 4 makes one rotation and passes through each imaging unit 20, a full-color (four-color) toner image is formed on the surface of transfer belt 4.

Thereafter, the full-color toner image formed on transfer belt 4 is transferred to paper S by a transfer roller 5. Transfer roller 5 is biased to a predetermined potential and this bias potential generates attraction force on the charged toner image due to the electrostatic field. In other words, this attraction force generated on the toner image is used to transfer the toner image from transfer belt 4 to paper S. Paper S having the transferred color toner image is fixed by a fixing device 6, and then, is output to an ejection tray.

This paper S is housed in a tray placed under image forming apparatus 1 and is sequentially conveyed correspondingly to a timing at which image forming processing is executed. A plurality of rollers driven by a stepping motor are arranged in a conveying path for paper S used for this image forming. In an example shown in FIG. 1, conveying rollers 11, 13 and 15 are arranged in this order from the tray side in which paper S is housed. These conveying rollers 11, 13 and 15 are rotationally driven by stepping motors 12, 14 and 16, respectively. In addition, a fixing roller of fixing device 6 is also driven by a stepping motor 18.

These stepping motors 12, 14, 16, and 18 are connected to corresponding drivers (that will be described later), respectively. These drivers receive a set value and/or a command value for driving the stepping motors, from control unit 10.

In other words, each stepping motor is arranged in the conveying path for the paper on which an image is formed. Control unit 10 changes as appropriate the rotation speed set for each stepping motor, in accordance with progress of the image forming processing.

Imaging units 20Y, 20M, 20C, and 20K include photoreceptor drums 21Y, 21M, 21C, and 21K for forming a toner image of each color corresponding to an output image, respectively. In each imaging unit 20, a charging device, an exposure device, a developing device, a charge removing device and the like are arranged along a direction in which photoreceptor drum 21 rotates. Photoreceptor drum 21 is exposed to light by the exposure device in response to a command from control unit 10, with a surface of photoreceptor drum 21 charged in advance by the charging device. The exposure device scans the surface of photoreceptor drum 21 with laser light in accordance with the output image, and thereby an electrostatic latent image corresponding to the output image is formed on the surface of photoreceptor drum 21. This electrostatic latent image is developed as a toner image as a result of adhesion of toner supplied in the developing device. The toner image developed on the surface of photoreceptor drum 21 is then transferred from each photoreceptor drum 21 to transfer belt 4 by contact between each photoreceptor drum 21 and transfer belt 4.

A charging grid high-voltage power supply 31 applies a bias voltage for charging photoreceptor drum 21, and a developing bias high-voltage power supply 32 applies a bias voltage for charging the toner.

Image forming apparatus 1 further includes a control panel 7. Control panel 7 serves as an input unit that receives various types of user operations and also serves as a display unit that notifies the user of various types of information. More specifically, as the function of the input unit, control panel 7 includes a touch sensor, a group of various types of input keys including a numerical keypad, and the like. Furthermore, as the function of the display unit, control panel 7 includes a liquid crystal display unit integrated with the touch sensor as well as various types of indicators formed of an LED (Light Emitting Diode) and the like.

Figure 2:
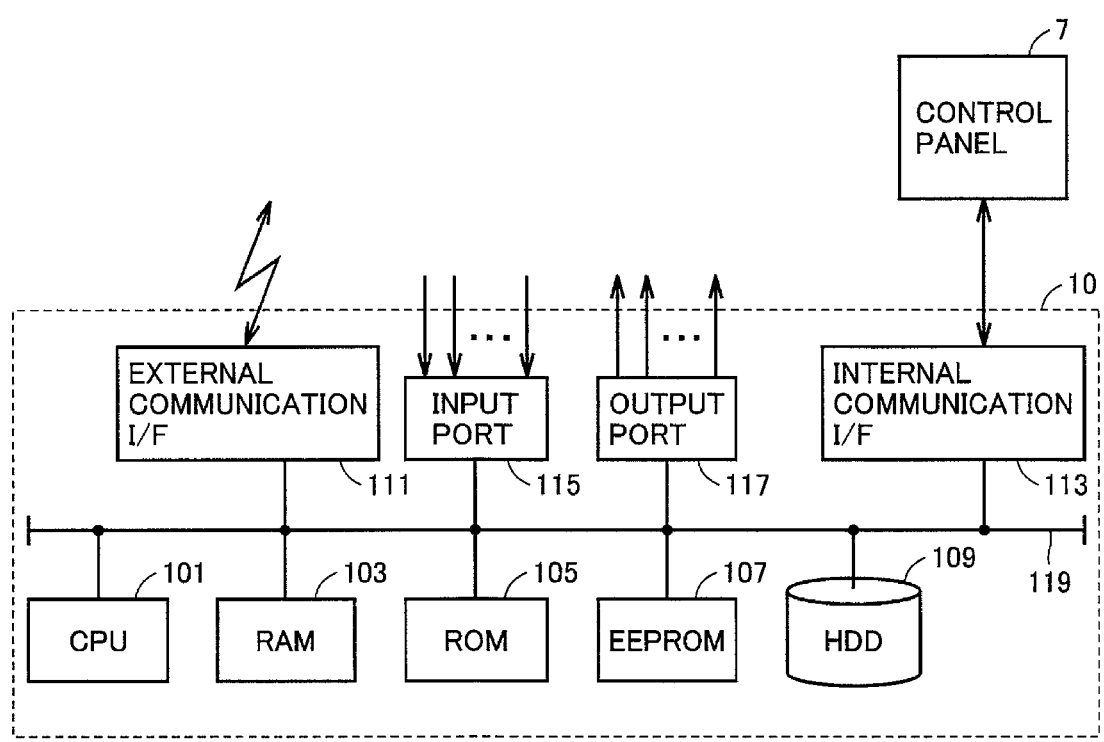
FIG. 2 is a diagram showing a schematic configuration of a control unit shown in FIG. 1.

Referring to FIG. 2, control unit 10 includes a CPU (Central Processing Unit) 101, an RAM (Random Access Memory) 103, an ROM (Read Only Memory) 105, an EEPROM (Electrical Erasable and Programmable Read Only Memory) 107, an HDD (Hard Disk Drive) 109, an external communication I/F (Interface) 111, an internal communication I/F 113, an input port 115, and an output port 117. It is to be noted that these portions are connected to one another by an internal bus 119.

In control unit 10, CPU 101 decompresses and executes, in RAM 103 and the like, a program for executing various types of processing that is prestored in ROM 105 and the like, and thereby image forming apparatus 1 is controlled.

RAM 103 is a volatile memory and is used as a work memory. More specifically, RANI 103 temporarily stores image data to be processed and various types of variable data, in addition to the executed program itself. EEPROM 107 is typically a nonvolatile semiconductor memory and stores various types of set values such as an IP address and a network domain of image forming apparatus 1. HDD 109 is typically a nonvolatile magnetic memory and accumulates the print job received from an image processing apparatus, the image data read by scanner 2, and the like.

External communication I/F 111 typically supports a versatile communication protocol such as Ethernet and provides data communication with the personal computer or other image forming apparatuses through a network.

Internal communication I/F 113 is connected to control panel 7. Internal communication I/F 113 receives a signal corresponding to the user operation of control panel 7 and transmits the signal to CPU 101. In addition, internal communication I/F 113 sends a signal required to display a message and the like on control panel 7, in response to a command from CPU 101.

Input port 115 typically includes an A/D (Analog to Digital) converter and captures a value from various types of sensors and the like included in print engine 3 and the like. On the other hand, output port 117 typically includes a D/A (Digital to Analog) converter and provides a command value and the like corresponding to a result of a computation performed by CPU 101 to various types of actuators included in print engine 3 and the like.

In the above example, control unit 10 is configured using the CPU that is one example of a processor. A DSP (Digital Signal Processor) may, however, be employed instead of or in addition to the CPU. Alternatively, a part or all of a control function as will be described later may be implemented as hardware such as an ASIC (Application Specific Integrated Circuit).

<Control Structure in Control Unit>

Figure 3:
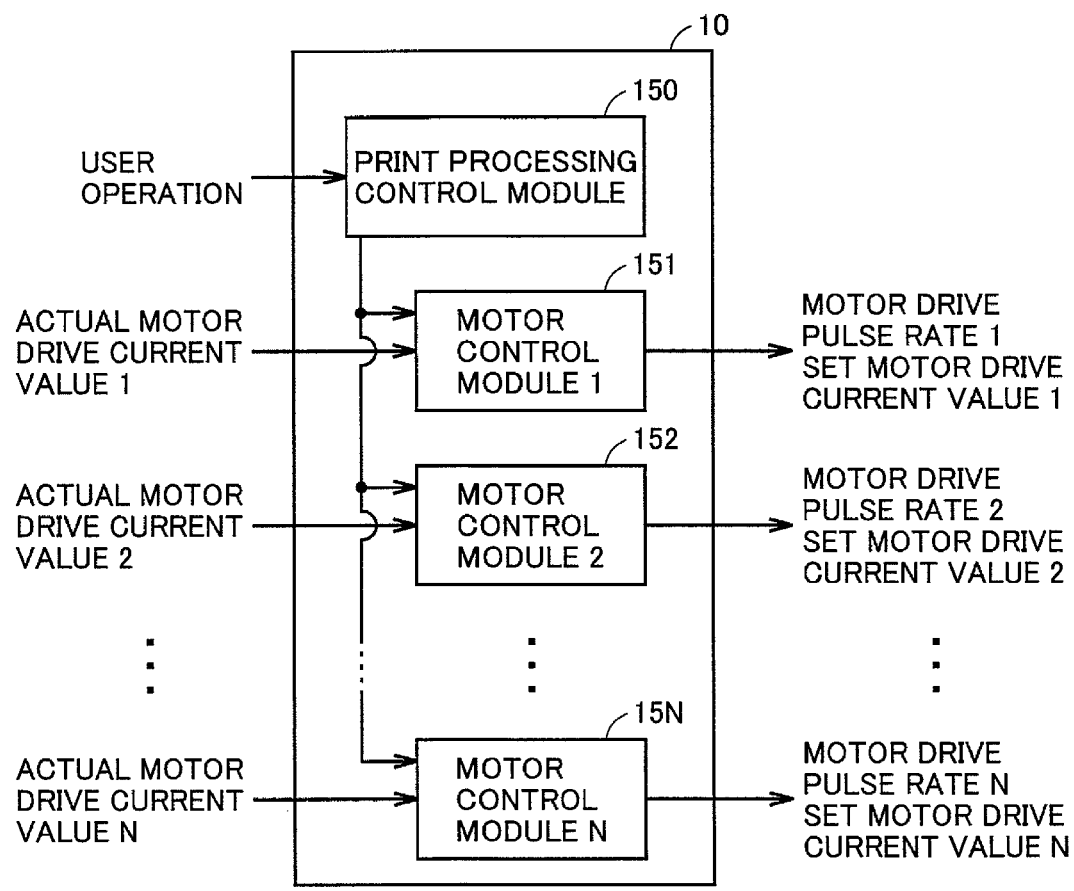
FIG. 3 is a schematic diagram showing a control structure in the control unit shown in FIG. 1.

Referring to FIG. 3, control unit 10 typically includes a print processing control module 150 and motor control modules 151, 152, . . . , and 15N.

Print processing control module 150 executes overall processing required for the print (image forming) processing, in response to the user operation of control panel 7 and the like. More specifically, print processing control module 150 issues a command for starting up each stepping motor at a predetermined timing or for starting production of image data to be printed, in accordance with a series of print processing sequence.

Each of motor control modules 151, 152, . . . , and 15N is associated with the corresponding driver. In other words, motor control modules 151, 152, . . . , and 15N receive actual motor drive current values 1, 2, . . . , and N from the drivers, respectively, and output motor drive pulse rates 1, 2, . . . , and N and set motor drive current values 1, 2, . . . , and N, which are control commands for driving the corresponding drivers, by computation processing that will be described later, respectively.

<Stepping Motor Drive Circuit>

Figure 4:
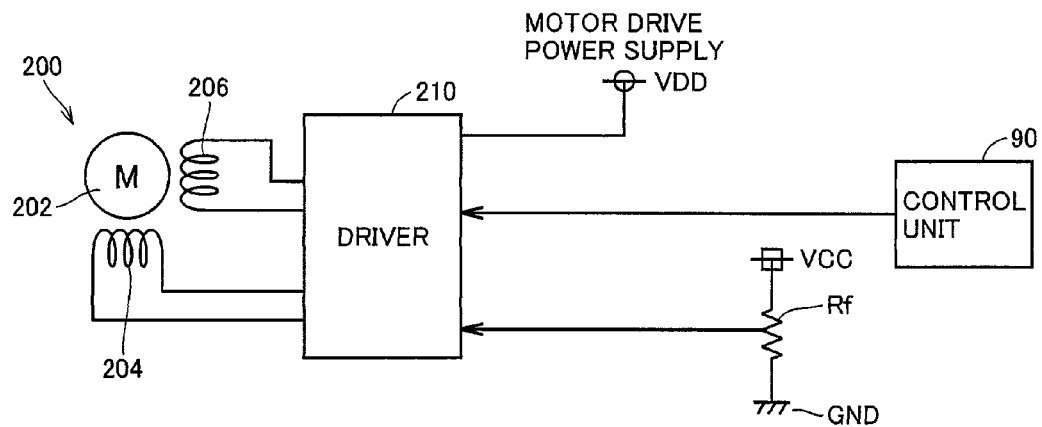
FIG. 4 shows one example of a circuit configuration for driving a stepping motor related to the present invention.
Figure 5:
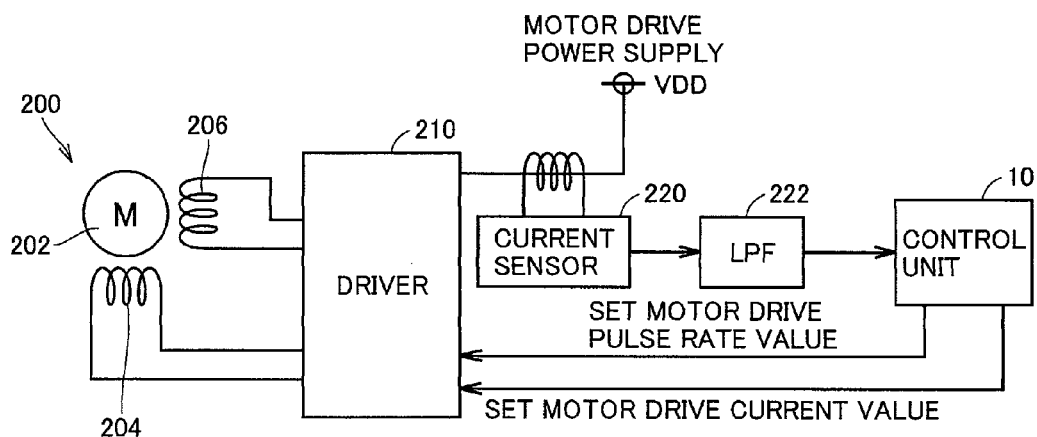
FIG. 5 shows one example of a circuit configuration for driving a stepping motor according to the first embodiment of the present invention.

FIG. 4 shows one example of a circuit configuration for driving a stepping motor related to the present invention. FIG. 5 shows one example of a circuit configuration for driving a stepping motor according to a first embodiment of the present invention.

FIG. 4 shows the circuit configuration suitable for a method for predicting maximum peak load torque that may be produced at each stepping motor and setting a set motor drive current value corresponding to the peak load torque. In other words, the circuit configuration shown in FIG. 4 includes a stepping motor 200, a driver 210 for driving stepping motor 200, and a control unit 90 for providing a set value of the rotation speed of stepping motor 200 to driver 210.

Although a stepping motor of any types can be employed as stepping motor 200, FIG. 4 shows a 1-2 phase excitation type stepping motor. More specifically, stepping motor 200 has a first phase coil 204 and a second phase coil 206. When a drive current (pulse current) is supplied from driver 210 to each of these coils 204 and 206, these coils 204 and 206 produce a magnetic field in stepping motor 200. A rotor of stepping motor 200 rotates by switching, at an appropriate timing, the magnetic field produced by these coils 204 and 206.

It is to be noted that the frequency of the drive current supplied from driver 210 to each of coils 204 and 206, that is, the rotation speed of stepping motor 200 is determined by a set motor drive pulse rate value provided by control unit 90. Typically, control unit 90 changes the set motor drive pulse rate value as appropriate, in accordance with progress of the image forming processing.

In addition, the magnitude of the drive current supplied from driver 210 to each of coils 204 and 206 is determined by the set motor drive current value corresponding to a voltage value extracted from a voltage dividing resistance Rf connected between a control power supply VCC and a ground GND. This set motor drive current value is determined in consideration of variations in apparatus, the environmental temperature, the durability of the apparatus and the like.

In contrast, as shown in FIG. 5, the circuit configuration for driving the stepping motor according to the present embodiment differs from the circuit configuration shown in FIG. 4 in that (a) a configuration for detecting the magnitude of a current used to drive stepping motor 200 and (b) a configuration for freely changing the set motor drive current value provided to driver 210 are added.

More specifically, as the above configuration (a), the circuit configuration for driving the stepping motor according to the present embodiment includes a current sensor 220 and a low pass filter (that will be referred to as "LPF" hereinafter) 222.

Current sensor 220 is arranged on a power supply path for supplying electric power from a motor drive power supply to driver 210, and detects the magnitude of a current flowing into driver 210 in accordance with the load in stepping motor 200 when stepping motor 200 is driven. In image forming apparatus 1 according to the present embodiment, load torque value of stepping motor 200 in each cycle is estimated based on this detected magnitude of the current.

In the present embodiment, a configuration in which current sensor 220 is provided on the power supply side of driver 210 is illustrated because the 1-2 phase excitation type stepping motor is employed. Current sensor 220 may, however, be provided at any positions if current sensor 220 can detect the magnitude of the current used to drive stepping motor 200. For example, current sensor 220 may be provided on the outflow-to-the-ground side of driver 210.

In addition, although FIG. 5 depicts a coil-type current sensor as one example of current sensor 220, a resistance-type (shunt) current sensor may be used.

LPF 222 filters a high-frequency component included in a raw current value detected by current sensor 220. This is because, when stepping motor 200 is driven in accordance with a constant current system, the current supplied from driver 210 to stepping motor 200 is a high-frequency switching current, and a torque fluctuation component as will be described later cannot be identified in the raw current value detected by current sensor 220.

A raw signal waveform detected by this current sensor 220 includes, in descending order of frequency, (i) a switching component (low current chopper control component) (tens of kilohertz to 100 kilohertz), (ii) an excitation step component (frequency of the pulse rate; in the case of a two-phase full-step excitation type, 1 to 5 kHz and an integral multiple thereof), (iii) an electrical angle cycle component (a quarter and an integral multiple of the excitation component; 250 Hz or more), (iv) a load fluctuation component due to engagement of motor gears (around 200 Hz), (v) a drive system vibration component (150 to 400 Hz) and the like, which depends on the rotation speed of stepping motor 200.

In a method for controlling the stepping motor according to the present embodiment, the frequency band of the load fluctuation component to be handled is approximately 100 Hz or less when there is no instantaneous fluctuation, and must be approximately 150 Hz when the instantaneous fluctuation must also be handled. Accordingly, LPF 222 having an appropriate cutoff frequency is employed depending on the frequency band of the load fluctuation component to be handled. As a result, by cutting the high-frequency component included in the raw signal waveform detected by current sensor 220, the actual motor drive current value including only the load fluctuation component of the intended frequency band can be obtained.

The actual motor drive current value output from LPF 222 is provided to control unit 10. Typically, a voltage value from LPF 222 is input to input port 115 of control unit 10. It is to be noted that the actual motor drive current value may be converted to a digital value using the A/D converter provided separately from control unit 10 and the result may be input to control unit 10, instead of being input to input port 115 inside control unit 10.

In addition, as described above, it is necessary to employ LPF 222 having an appropriate frequency band (cutoff frequency) depending on the load fluctuation component to be handled. LPF 222 having a fixed frequency band or programmable-type LPF 222 whose frequency band can be changed in response to the command from control unit 10 can be employed. Alternatively, a configuration can also be employed, in which a cutoff frequency higher than the frequency band that can be captured by control unit 10 (or may be wider frequency band including a component other than the load fluctuation component to be handled) is set for LPF 222 and control unit 10 cuts a component in the unnecessary frequency band using internal processing (digital filter).

Figure 6:
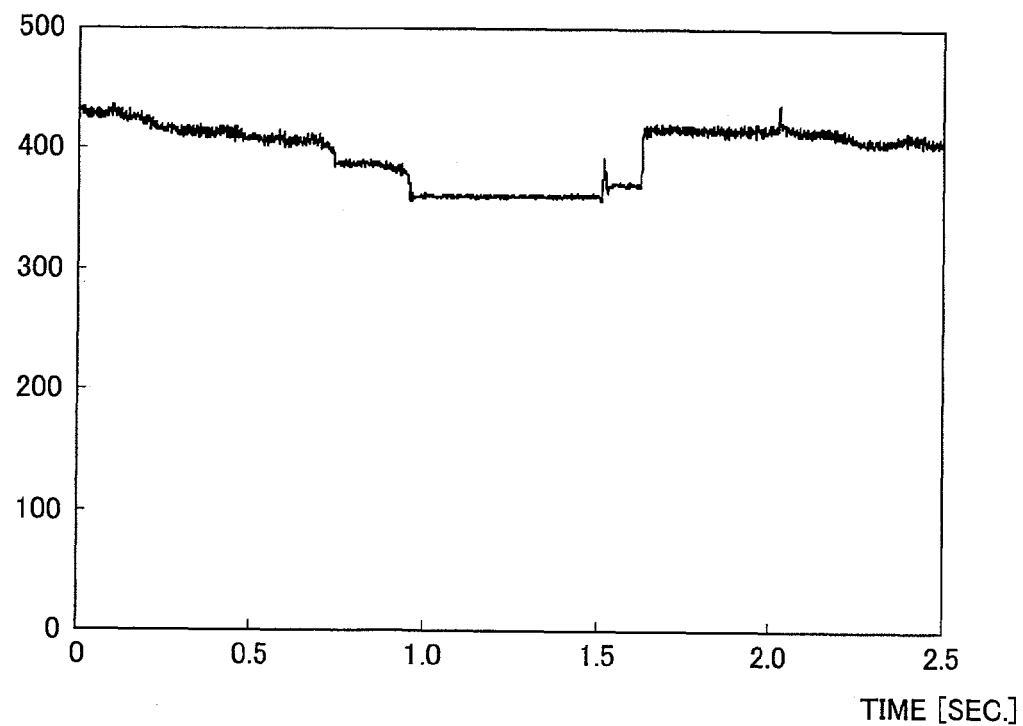
FIG. 6 shows one example of a temporal change in actual motor drive current value detected using a current sensor and a low pass filter shown in FIG. 5.

FIG. 6 shows one example of a temporal change in actual motor drive current value detected using current sensor 220 and LPF 222 as described above. Here, the scale of the vertical axis shown in FIG. 6 is a converted value. In other words, the actual signal waveform of LPF 222 is expressed by a voltage value having an appropriate range as a result of scaling of current sensor 220, and when this voltage value is captured from the input port of control unit 10, the voltage value is treated as digital data (binary value) quantized in accordance with the resolution of the A/D converter.

It is to be noted that a value indicating the magnitude of the current used to drive stepping motor 200 is collectively called "actual motor drive current value" in the specification. Therefore, "actual motor drive current value" may include a result obtained by detecting the magnitude of the current flowing through the coils of stepping motor 200 and then flowing from driver 210 to the ground, and other results, in addition to the result obtained by detecting the magnitude of the current supplied from motor drive power supply VDD to driver 210 (FIG. 5).

Next, as the above configuration (b), control unit 10 according to the present embodiment can freely set the set motor drive current value for driver 210. This set motor drive current value determines a target value of the magnitude of the pulse current supplied from driver 210 to stepping motor 200. Therefore, torque produced by stepping motor 200 can be freely controlled using the set motor drive current value.

It is to be noted that the set motor drive current value is typically provided as a voltage value. Therefore, in the configuration shown in FIG. 5, a control command from CPU 101 is converted to an analog voltage value by the D/A converter and the analog voltage value is output at output port 117 of control unit 10. Alternatively, the set motor drive current value from control unit 10 may be set using the D/A converter provided separately from control unit 10. Alternatively, an electronic volume provided separately from control unit 10 may be used.

"Set motor drive current value" herein refers to a value corresponding to "actual motor drive current value" described above. "Set motor drive current value" is provided to driver 210, while a value indicating the magnitude of the motor drive current used to drive stepping motor 200 is collectively called "actual motor drive current value."

In addition, control unit 10 can also freely set the set motor drive pulse rate value for driver 210. This set motor drive pulse rate value determines the frequency of the pulse current supplied from driver 210 to stepping motor 200. Therefore, the rotation speed of stepping motor 200 can be freely controlled using the set motor drive pulse rate value. Control unit 10 changes the set motor drive pulse rate value as appropriate in accordance with progress of the image forming processing.

Instead of the configuration in which output port 117 of control unit 10 is used, a configuration in which the set motor drive pulse rate value is output through the ASIC provided separately from control unit 10 may be employed.

<Overview of Stepping Motor Control>

As will be described in detail hereinafter, in the image forming apparatus according to the present embodiment, the load torque applied to stepping motor 200 in each cycle is estimated based on a relationship between the actual motor drive current supplied to stepping motor 200 and the load torque of stepping motor 200. Then, a value having an appropriate margin with respect to this estimated load torque value is determined as target load torque value. Furthermore, a current value that allows production of this determined target load torque value is output as a new set motor drive current value.

As described above, in the image forming apparatus according to the present embodiment, the driver is controlled such that the appropriate margin is constantly ensured with respect to the load torque applied to each stepping motor. As a result, an appropriate current value is constantly supplied to the driver correspondingly to load fluctuations.

<Computation Processing Block>

Figure 7:
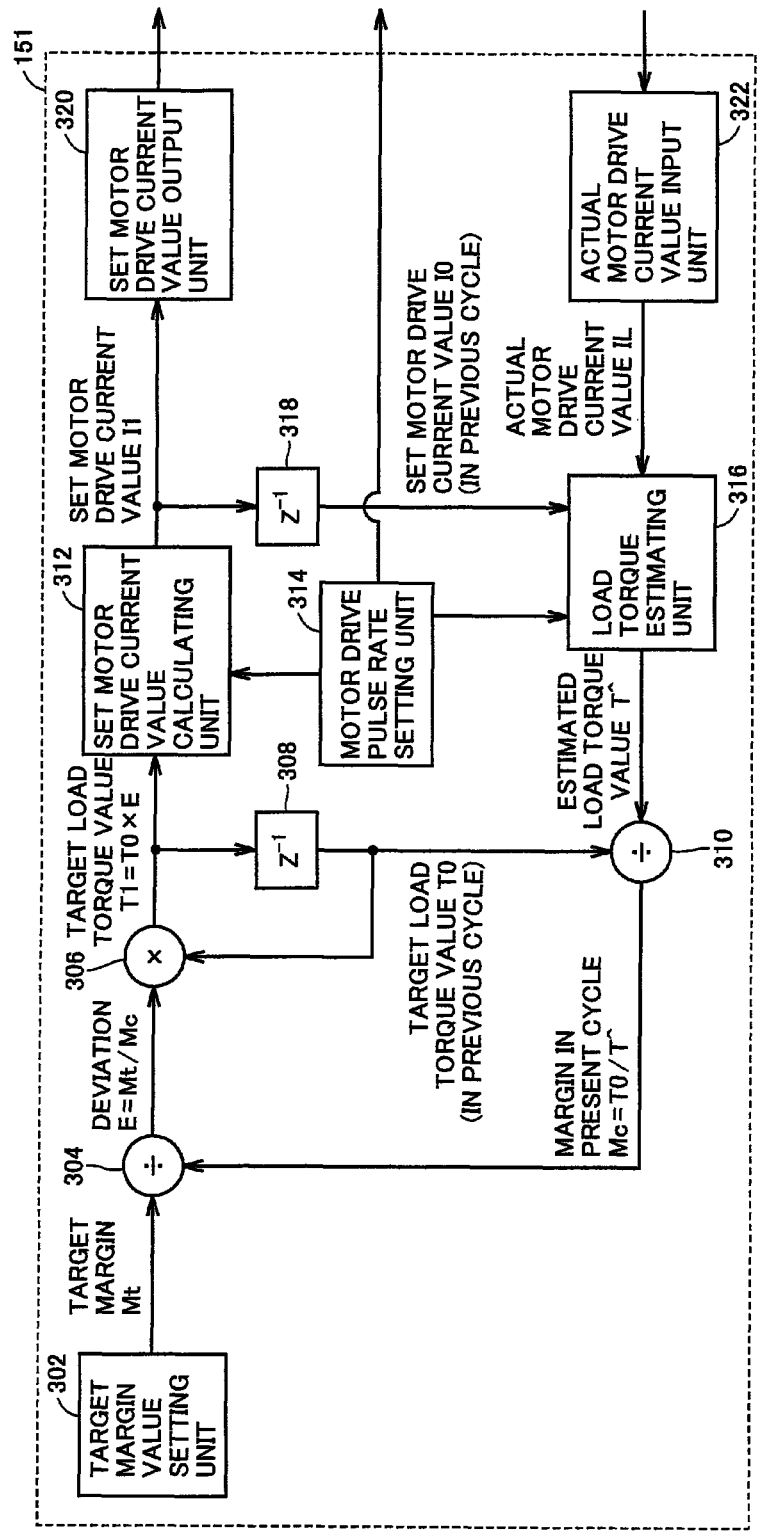
FIG. 7 is a block diagram for illustrating processing executed by a motor control module shown in FIG. 3.

FIG. 7 is a block diagram for illustrating processing executed by the motor control module shown in FIG. 3. Although FIG. 7 shows processing executed by motor control module 151, the same applies as well to other motor control modules 152, . . . , and 15N.

Referring to FIG. 7, motor control module 151 includes a target margin value setting unit 302, dividing units 304 and 310, a multiplying unit 306, delay elements 308 and 318, a set motor drive current value calculating unit 312, a motor drive pulse rate setting unit 314, a load torque estimating unit 316, a set motor drive current value output unit 320, and an actual motor drive current value input unit 322. Each portion operates in a predetermined cycle. Therefore, in each cycle, actual motor drive current value input unit 322 obtains an actual motor drive current value IL in the present cycle (current cycle), and a set motor drive current value I1 in this cycle calculated by computation processing that will be described later is output from set motor drive current value output unit 320.

Load torque estimating unit 316 estimates the load torque applied to corresponding stepping motor 200 in this cycle, based on actual motor drive current value IL, a set motor drive current value I0 in the previous cycle, and the set motor drive pulse rate value. This load torque value estimated by load torque estimating unit 316 will be described as "estimated load torque value T^" hereinafter. This processing of estimating the load torque by load torque estimating unit 316 will be described later.

Based on estimated load torque value T^, target margin value setting unit 302, dividing units 304 and 310, multiplying unit 306, and delay element 308 determine a target load torque value T1, which indicates torque to be output by stepping motor 200. In other words, these portions provide a feedback loop about a target margin Mt output from target margin value setting unit 302.

More specifically, dividing unit 310 calculates a ratio of a target load torque value T0 calculated in the previous cycle to estimated load torque value T^ calculated in the present cycle. In other words, dividing unit 310 calculates a margin Mc (=T0/T^) in the present cycle. This margin Mc in the present cycle refers to a margin of maximum load torque that was able to be produced by stepping motor 200 in the previous cycle because of the current supplied from driver 210 to stepping motor 200, with respect to the magnitude of the load torque of stepping motor 200 estimated in the present cycle.

Target margin value setting unit 302 outputs target margin Mt, which is a margin for stable image forming processing in image forming apparatus 1. This target margin Mt may be changed with progress of the image forming processing.

Dividing unit 304 calculates a ratio of target margin Mt to margin Mc in the present cycle calculated by dividing unit 310. In other words, dividing unit 304 calculates a deviation E (=Mt/Mc) of the margin. This deviation E of the margin is a value indicating how much (ratio) target load torque value T0 in the previous cycle deviates from target margin Mt set by target margin value setting unit 302 when achievement of target margin Mt is attempted. Therefore, multiplying unit 306 multiplies target load torque value T0 in the previous cycle by deviation E of the margin, and thereby target load torque value T1 in the present cycle is calculated.

Set motor drive current value calculating unit 312 calculates set motor drive current value I1 in this cycle to be supplied to corresponding stepping motor 200, based on target load torque value T1 in the present cycle provided from dividing unit 304 and the set motor drive pulse rate value. This processing of calculating set motor drive current value I1 by set motor drive current value calculating unit 312 will be described later. Set motor drive current value I1 calculated by set motor drive current value calculating unit 312 is then provided to corresponding driver 210 through set motor drive current value output unit 320.

Motor drive pulse rate setting unit 314 outputs the set motor drive pulse rate value for controlling the rotation speed of corresponding stepping motor 200. It is to be noted that a timing at which motor drive pulse rate setting unit 314 changes the set motor drive pulse rate value may be set independently of the cycle for set motor drive current value I1.

By configuring the feedback loop about target margin Mt as shown in FIG. 7 as described above, margin Mc in each cycle of stepping motor 200 can match target margin Mt. Therefore, stepping motor 200 can be driven while ensuring an appropriate margin in accordance with the magnitude of the load actually applied to stepping motor 200. It is to be noted that since target margin Mt is usually set to a value exceeding 1 in the control loop shown in FIG. 7, target load torque value T1 is determined such that a ratio of target load torque value T1 to estimated load torque value T^ exceeds 1.

When execution of continuous paper conveyance is requested, target margin Mt may be set to a relatively high value in conveyance of a first paper and target margin Mt may be gradually decreased to a proper level depending on the situation in subsequent paper conveyance. In other words, in the continuous image forming processing, the ratio (target margin Mt) of target load torque value T1 to estimated load torque value T^ may be set to be large in advance and the ratio may be reduced as the image forming processing proceeds.

It is to be noted that in actual implementation of software, not a value having a real physical unit but a value obtained by multiplying the value by a constant may be used for the computation processing in each unit. In this case, a fixed-point computation that allows higher-speed processing, not a floating-point computation, can be applied.

<Calculation of Estimated Load Torque Value>

Next, the processing of calculating estimated load torque value T^ by load torque estimating unit 316 shown in FIG. 7 will be described in detail.

A current conversion method used to control a DC motor and a DC brushless motor is based on the principle that a relationship between current and torque is uniquely determined under a constant voltage condition as for an uncontrolled motor and the relationship between current and torque is uniquely determined for a condition of the control speed under the constant voltage condition as for a constant-speed control motor.

In contrast, when the stepping motor is controlled in accordance with a constant current control method, the relationship between the actual motor drive current and the load torque changes dependently of the magnitude of the set motor drive current value even if the rotation speed (pulse rate) is fixed under the constant voltage condition.

The set motor drive current value is a value for controlling maximum output torque of the stepping motor. Therefore, if the set motor drive current value is changed to achieve the maximum output torque having the appropriate level of margin with respect to the load torque, the relationship between the actual motor drive current and the load torque changes as described above, and the load torque cannot be estimated simply. Therefore, a parameter of the set motor drive current value must be fixed to estimate the load torque value.

Figure 8:
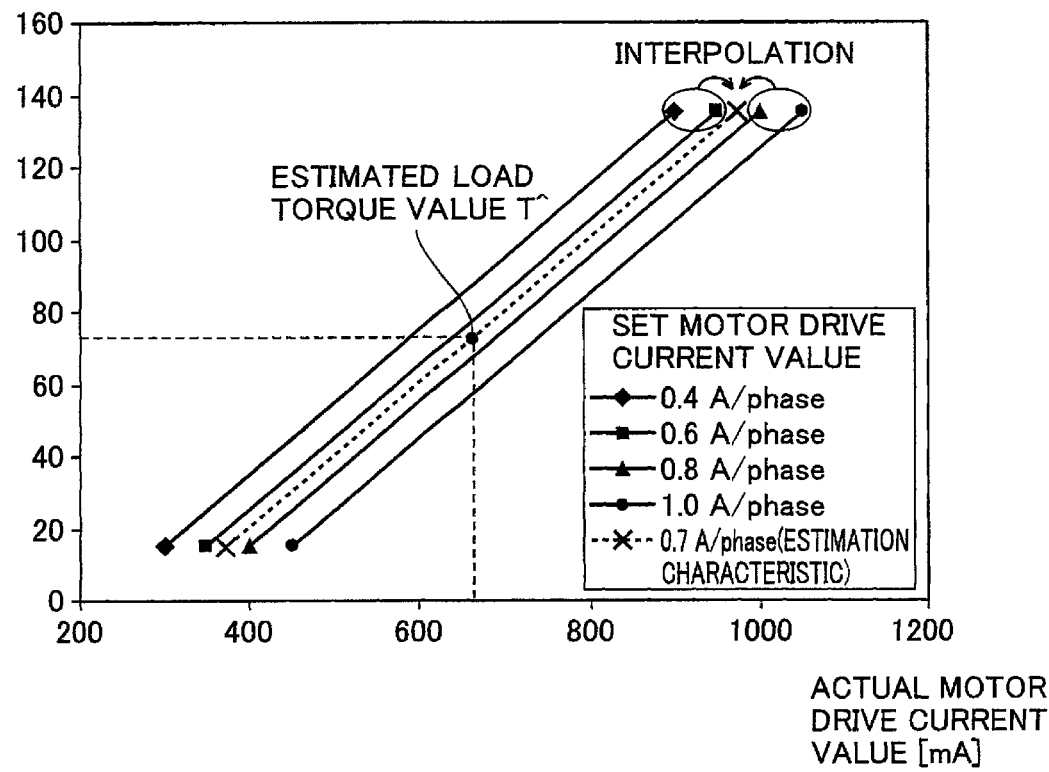
FIG. 8 shows one example of a relationship between the actual motor drive current and load torque according to the first embodiment of the present invention.

FIG. 8 shows an example of a change in relationship between the actual motor drive current and the estimated load torque value dependent on the set motor drive current value. The set motor drive current value is known because the set motor drive current value is a parameter determined by control unit 10. Therefore, a plurality of set motor drive current values of different magnitude are set for a motor drive system of interest (stepping motor 200 and driver 210) and the relationship between the actual motor drive current and the load torque is experimentally obtained for each set motor drive current value.

The example shown in FIG. 8 describes the relationship between the actual motor drive current and the load torque when the set motor drive current value is set to any one of the following four types: 0.4 A/phase, 0.6 A/phase, 0.8 A/phase, and 1.0 A/phase. Here, the load torque refers to the magnitude of torque actually output by stepping motor 200 under a certain condition.

Since the magnitude of the set motor drive current value provided to driver 210 changes depending on the operating state and the like, the magnitude of the set motor drive current value does not necessarily match any one of the above four types completely. Therefore, load torque estimating unit 316 according to the present embodiment stores a plurality of relationships between the actual motor drive current and the load torque for a plurality of set motor drive current values of different magnitude as shown in FIG. 8. Load torque estimating unit 316 determines the relationship between the actual motor drive current and the load torque in each control cycle in respect to the set current value in the previous cycle, using two or more relationships related to the set motor drive current value in the previous cycle, of the plurality of relationships between the actual motor drive current and the load torque.

As one example, FIG. 8 shows the example in which the relationship between the actual motor drive current and the load torque when the set motor drive current value is set to 0.7 A/phase is determined from the previous and subsequent two relationships between the actual motor drive current and the load torque, using interpolation processing (linear interpolation processing). By sequentially updating the relationship between the actual motor drive current and the load torque in coordination with the magnitude of the set motor drive current value provided to driver 210 as described above, the load torque value in each cycle can be estimated more accurately.

In other words, load torque estimating unit 316 according to the present embodiment determines, as estimated load torque value T^, the load torque corresponding to the set motor drive current value in the previous cycle and the actual motor drive current value in the present cycle, by referring to the relationship between the actual motor drive current and the load torque of the stepping motor in respect to the set motor drive current value.

Figure 9:
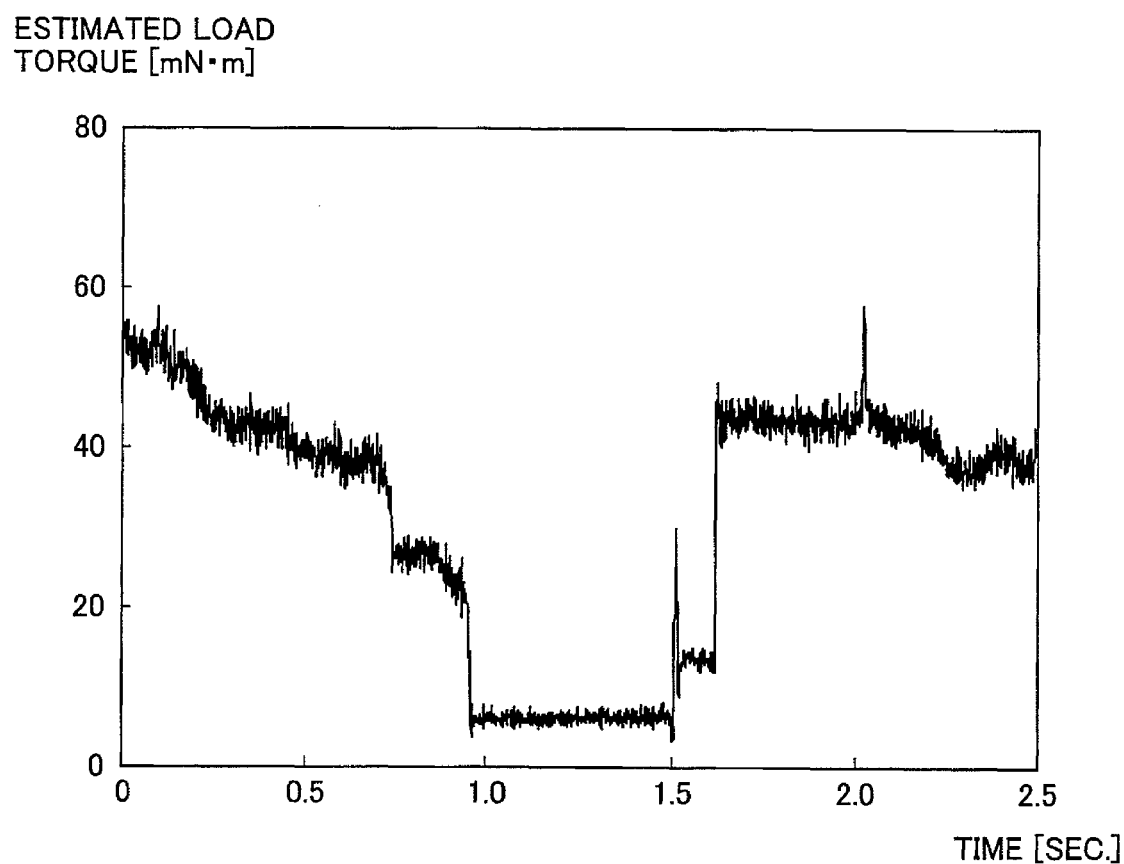
FIG. 9 shows one example of a temporal change in estimated load torque calculated based on the temporal change in actual motor drive current value shown in FIG. 6.

FIG. 9 shows one example of a temporal change in estimated load torque value T^ obtained by executing the load torque value estimation processing as described above to the actual motor drive current value shown in FIG. 6. As shown in FIG. 9, it can be seen that estimated load torque value T^ fluctuates relatively greatly even in the same image forming processing (paper conveyance control).

It is to be noted that the relationship between the actual motor drive current and the load torque shown in FIG. 8 changes dependently of the rotation speed (drive pulse rate) of stepping motor 200 as well. Therefore, load torque estimating unit 316 according to the present embodiment may store the plurality of relationships between the actual motor drive current and the load torque as shown in FIG. 8 for the respective drive pulse rates, and may select or dynamically produce the necessary relationship between the actual motor drive current and the load torque in accordance with the set drive pulse rate value in each cycle.

Figure 10A:
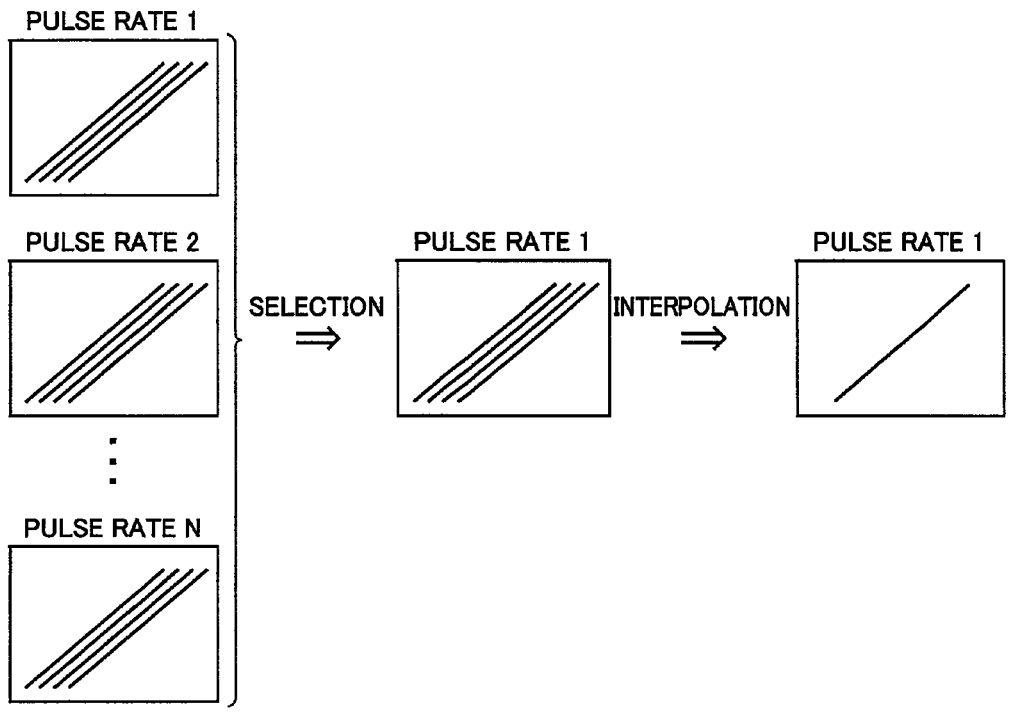
FIGS. 10A and 10B are diagrams for illustrating processing for determining the relationship between the actual motor drive current and the load torque according to the first embodiment of the present invention.

More specifically, as shown in FIG. 10A, load torque estimating unit 316 selects the relationship between the actual motor drive current and the load torque corresponding to the set motor drive pulse rate value provided to driver 210, from the plurality of relationships between the actual motor drive current and the load torque obtained in advance for respective pulse rates 1, 2, . . . , and N. Then, load torque estimating unit 316 may determine the relationship between the actual motor drive current and the load torque corresponding to the set motor drive current value provided to driver 210, using the interpolation processing and the like as described above.

Figure 10B:
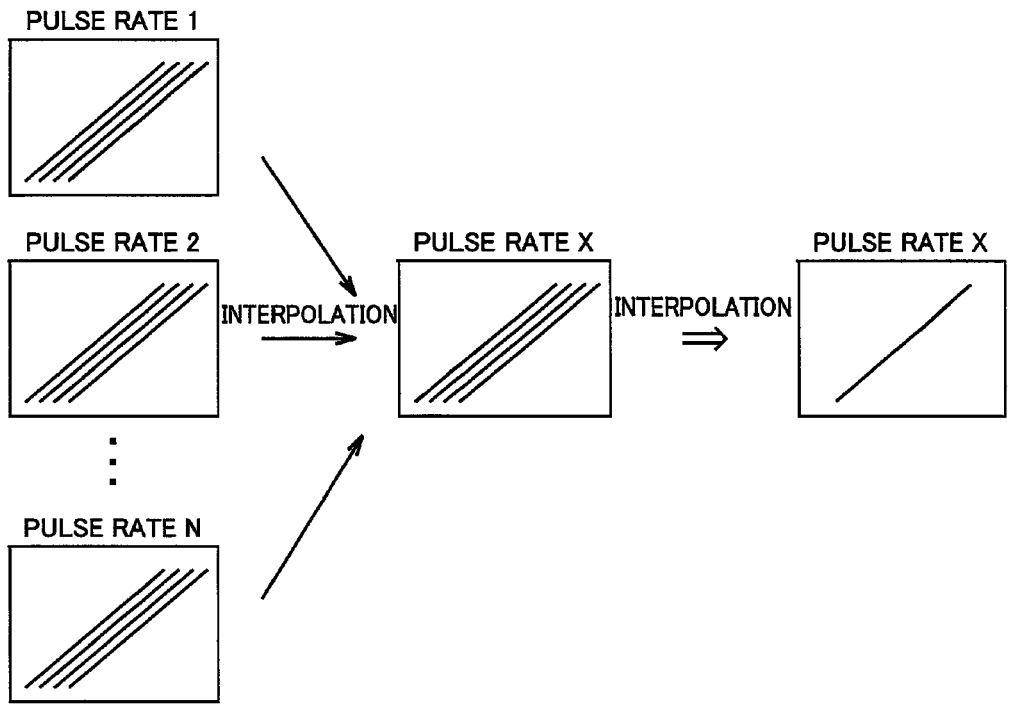

In some cases, stepping motor 200 may be driven at a pulse rate that does not match any one of the pulse rates obtained in advance, when stepping motor 200 is activated, when stepping motor 200 is deactivated, when the rotation speed of stepping motor 200 is changed, and the like. In this case, processing as shown in FIG. 10B may be employed. In other words, in the processing shown in FIG. 10B, load torque estimating unit 316 determines the relationship between the actual motor drive current and the load torque in respect to the set motor drive pulse rate value, using two or more relationships related to the set motor drive pulse rate value provided to driver 210, of the plurality of relationships between the actual motor drive current and the load torque obtained in advance for respective pulse rates 1, 2, . . . , and N. In this case as well, linear interpolation or high-order interpolation can be used. By further applying the interpolation processing and the like as described above to the relationship between the actual motor drive current and the load torque in respect to the intended set motor drive pulse rate value, the relationship between the actual motor drive current and the load torque corresponding to the set motor drive current value provided to driver 210 can be determined.

In the general paper conveyance control in the image forming apparatus, however, there are only a few patterns of the rotation speed of the stepping motor in a steady state in many cases. Therefore, as for the relationship between the actual motor drive current and the load torque shown in FIGS. 10A and 10B, obtainment in advance of only the few patterns corresponding to the steady state suffices in many cases. Therefore, estimated load torque value T^ may be determined as follows: the method as shown in FIG. 10A described above is employed in the steady state of the paper conveyance control, whereas estimated load torque value T^ is provisionally calculated in accordance with the method as shown in FIG. 10A using a value of the drive pulse rate before acceleration or deceleration starts or a value of the drive pulse rate when acceleration or deceleration is completed, and further, acceleration or deceleration torque (a value when it is assumed that there is no fluctuations due to the environment and the durability) is incorporated into the provisional value in the transient state (a situation where the rotation speed of the stepping motor changes continuously, such as when the stepping motor is activated, when the stepping motor is deactivated, and when the rotation speed of the stepping motor is changed).

<Calculation of Set Motor Drive Current Value>

Next, the processing of calculating set motor drive current value I1 by set motor drive current value calculating unit 312 shown in FIG. 7 will be described in detail.

Figure 11:
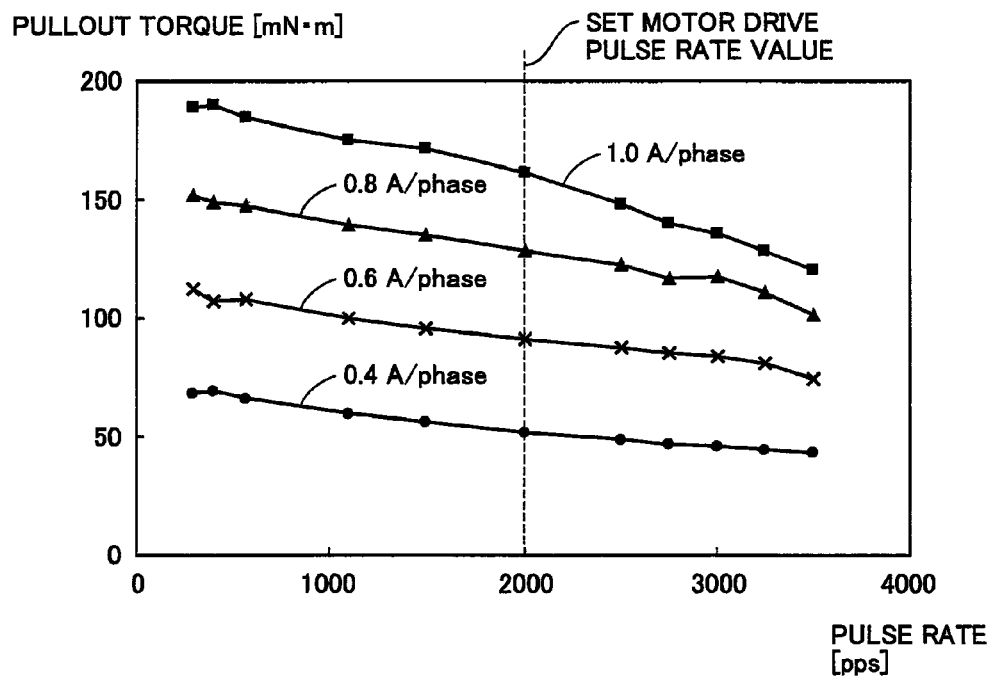
FIG. 11 shows one example of a relationship between pulse rates and pullout torque according to the first embodiment of the present invention.

A relationship between the pulse rates and the pullout torque shown in FIG. 11 is a maximum output torque (pullout torque) characteristic of the stepping motor generally used for evaluation of the performance of the stepping motor. In other words, a maximum value of torque that can be output by stepping motor 200 is indicated for each motor drive current value. Put another way, the characteristic line shown in FIG. 11 indicates a boundary value at which stepping motor 200 loses steps when the load torque larger than the corresponding load torque is applied.

Figure 12:
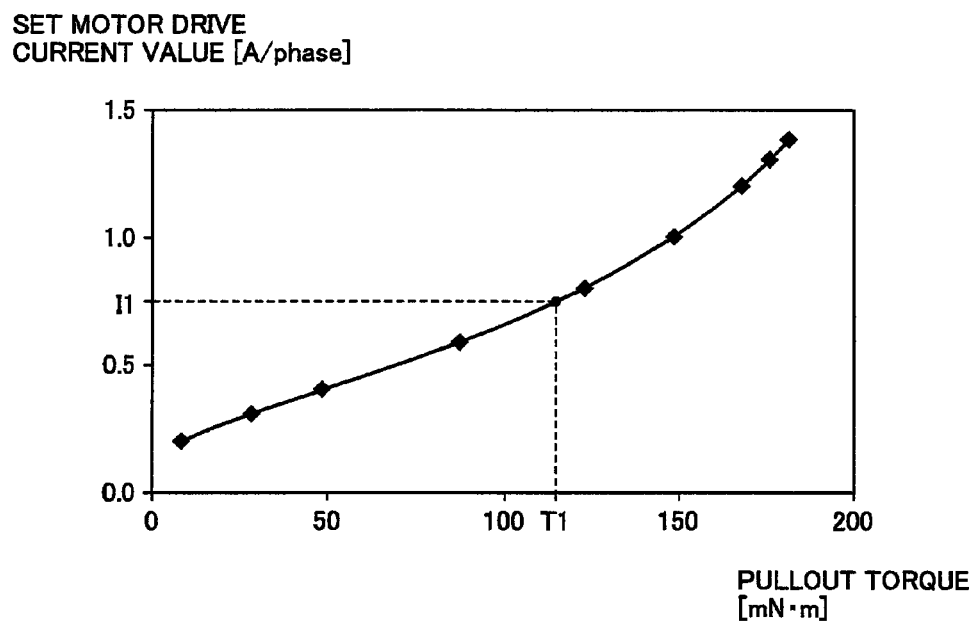
FIG. 12 shows one example of a relationship between the pullout torque and set motor drive current, which is calculated from the relationship between the pulse rate and the pullout torque shown in FIG. 11.

Accordingly, if the relationship between the pulse rates and the pullout torque as shown in FIG. 11 is obtained in advance, a relationship between the pullout torque and the set motor drive current as shown in FIG. 12 can be uniquely determined by fixing the rotation speed (drive pulse rate) of driving of stepping motor 200. The current value corresponding to target load torque value T1 can be determined as the set motor drive current value from the relationship between the pullout torque and the set motor drive current shown in FIG. 12.

The relationship between the pulse rates and the pullout torque shown in FIG. 12 is calculated using a value of the pullout torque corresponding to the intended set motor drive pulse rate value, of a plurality of relationships between the pulse rates and the pullout torque obtained for respective set motor drive current values shown in FIG. 11. Typically, as shown in FIG. 11, the relationship between the pullout torque and the set motor drive current as shown in FIG. 12 is determined by making polynomial approximation of a plurality of pullout torque values corresponding to respective positions of the set motor drive pulse rate values.

It is to be noted that other methods can also be employed instead of the method for determining the relationship between the pullout torque and the set motor drive current using the polynomial approximation. For example, the relationship between the pullout torque and the set motor drive current may be measured for each of the plurality of set motor drive pulse rate values of different magnitude, and the relationship between the pullout torque and the set motor drive current in respect to the intended set motor drive pulse rate value may be determined using the interpolation processing.

In other words, set motor drive current value calculating unit 312 shown in FIG. 7 obtains the maximum output torque of stepping motor 200 corresponding to the set drive pulse rate value provided to stepping motor 200, from a relationship between the set drive pulse rates of stepping motor 200 and the maximum output torque of stepping motor 200. Then, set motor drive current value calculating unit 312 determines a relationship between the maximum output torque of stepping motor 200 and the magnitude of the current supplied to stepping motor 200 in respect to the rotation speed set for stepping motor 200.

It is to be noted that since the value of the drive pulse rate changes when stepping motor 200 is activated, when stepping motor 200 is deactivated, when the rotation speed of stepping motor 200 is changed, and the like, the relationship between the pullout torque and the set motor drive current as shown in FIG. 12 must be determined for every change in drive pulse rate. In the general paper conveyance control in the image forming apparatus, however, there are only a few patterns of the rotation speed of the stepping motor in a steady state in many cases. Therefore, as for the relationship between the pullout torque and the set motor drive current shown in FIG. 12, obtainment in advance of only the few patterns corresponding to the steady state suffices in many cases.

A final set motor drive current value may be determined by provisionally calculating the set motor drive current value in accordance with the method as shown in FIGS. 11 and 12 using a value of the drive pulse rate before acceleration or deceleration starts or a value of the drive pulse rate when acceleration or deceleration is completed, and further, incorporating acceleration or deceleration torque (a value when it is assumed that there is no fluctuations due to the environment and the durability) into the provisional value in the transient state (a situation where the rotation speed of the stepping motor changes continuously, such as when the stepping motor is activated, when the stepping motor is deactivated, and when the rotation speed of the stepping motor is changed).

<Other Configuration>

In the computation processing block shown in FIG. 7, multiplication and division in the computation processing block can be replaced with addition and subtraction by defining a torque value with a logarithmic axis (log scale) as a characteristic value used to calculate set motor drive current value I1 and a characteristic value used to calculate estimated load torque value $T\hat{}$.

<Flowchart>

Figure 13:
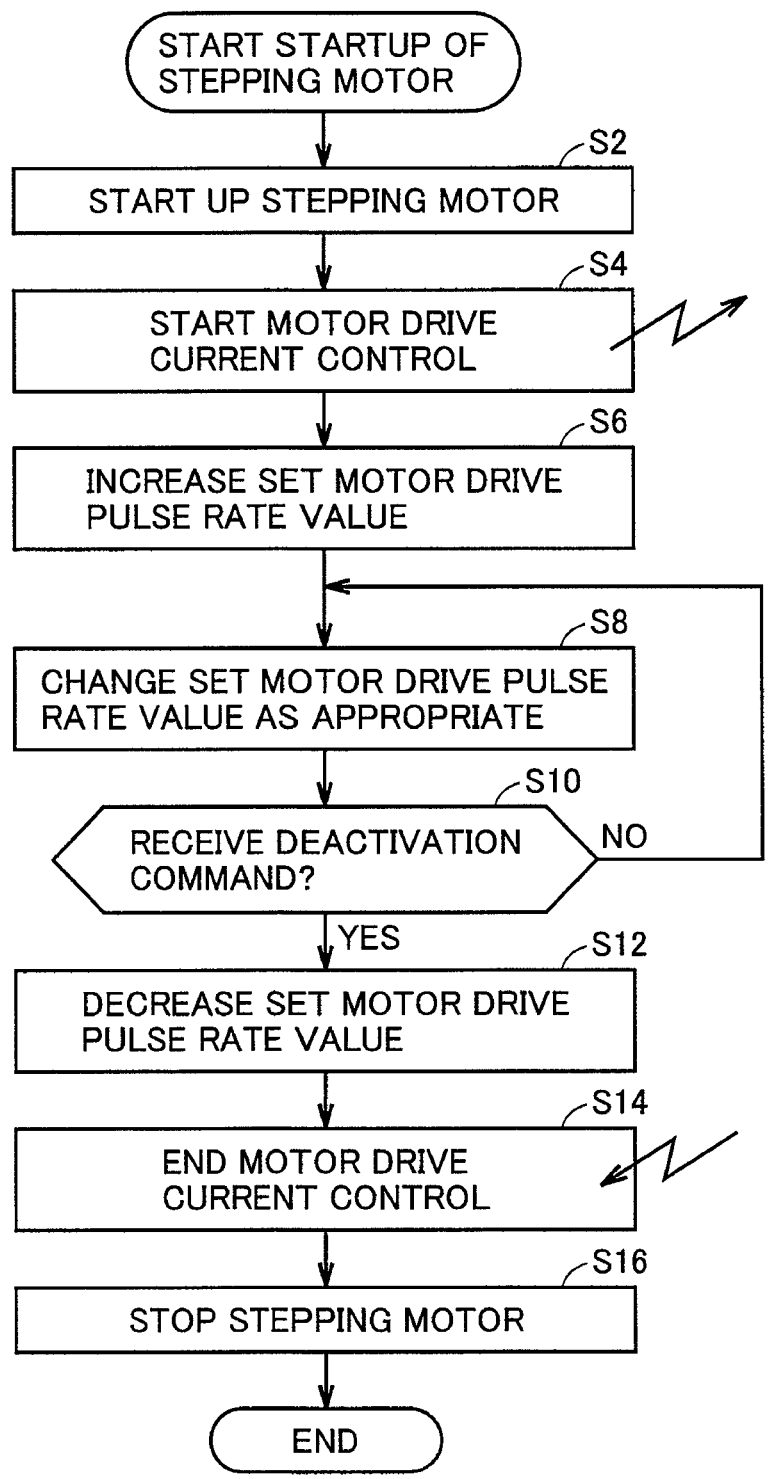
FIG. 13 is a flowchart showing overall processing of the stepping motor according to the first embodiment of the present invention.
Figure 14:
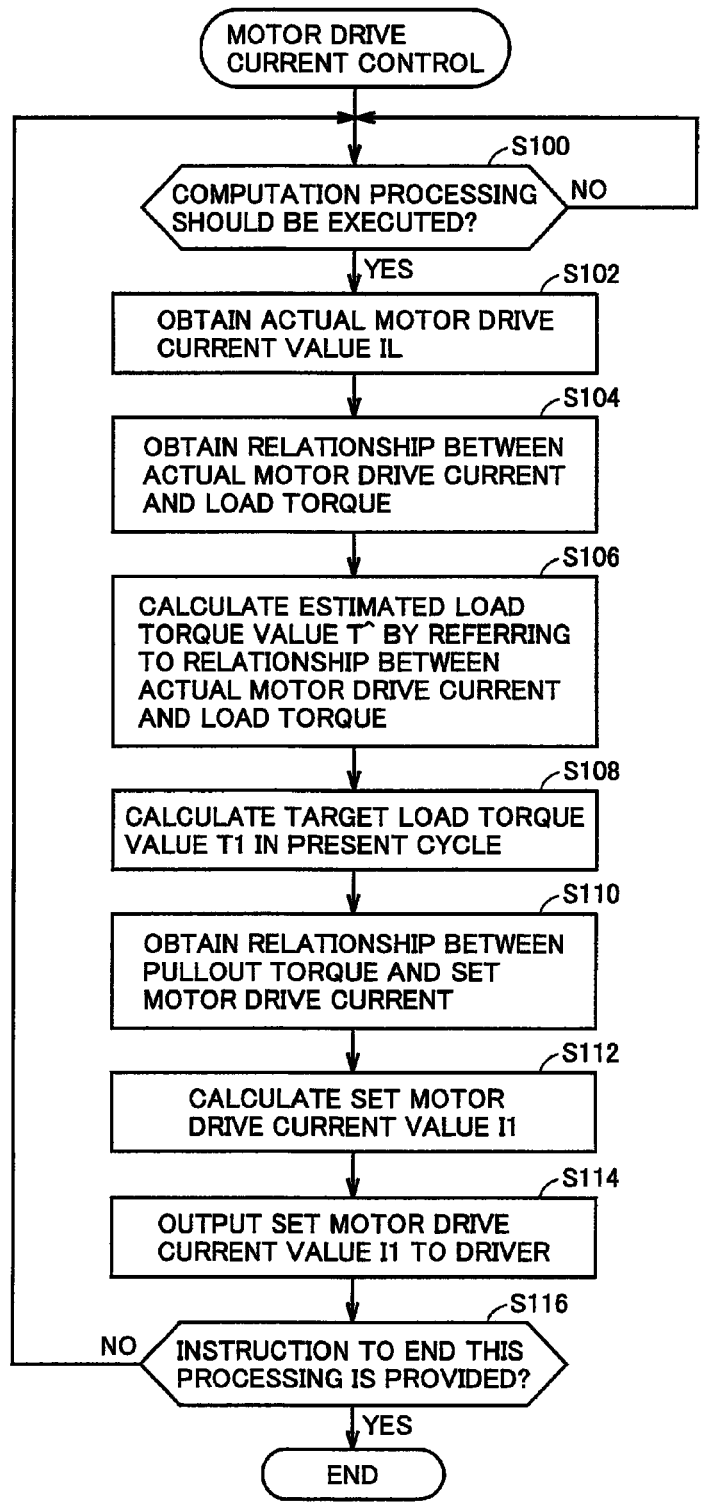
FIG. 14 is a flowchart showing processing for controlling the set motor drive current value for the stepping motor according to the first embodiment of the present invention.

A processing procedure in control unit 10 described above can be summarized in flowcharts as shown in FIGS. 13 and 14.

Referring to FIG. 13, CPU 101 (motor control module 151 shown in FIG. 3) starts overall processing shown in FIG. 13 in response to a command for starting startup of the stepping motor. It is to be noted that print processing control module 150 shown in FIG. 3 issues the command for starting startup of the stepping motor.

More specifically, CPU 101 starts up stepping motor 200 by setting an excitation signal of driver 210 to ON (step S2). Subsequently, CPU 101 executes processing shown in FIG. 14 for controlling the current supplied to stepping motor 200, as a separate task (step S4).

Then, CPU 101 increases the magnitude of the set motor drive pulse rate value provided to driver 210 to a predetermined value (step S6). In other words, CPU 101 activates stepping motor 200. Thereafter, CPU 101 changes the set motor drive pulse rate value as appropriate in accordance with progress of the image forming processing (step S8).

Thereafter, CPU 101 determines whether or not CPU 101 has received a command for deactivating stepping motor 200 (step S10). If CPU 101 does not have received the command for deactivating stepping motor 200 (NO in step S10), the processing in step S8 is repeated.

In contrast, if CPU 101 has received the command for deactivating stepping motor 200 (YES in step S10), CPU 101 decreases the magnitude of the set motor drive pulse rate value provided to driver 210 to zero (step S12). In other words, CPU 101 deactivates stepping motor 200.

In addition, CPU 101 ends the processing for controlling the current supplied to stepping motor 200, which was executed as the separate task in step S4 (step S14).

Finally, CPU 101 stops stepping motor 200 by setting the excitation signal of driver 210 to OFF (step S16).

When an instruction to start the processing for controlling the current supplied to stepping motor 200 is provided in step S4 in FIG. 13, the processing starts in line with the flowchart shown in FIG. 14. In other words, as shown in FIG. 14, CPU 101 first determines whether or not computation processing should be executed (step S100). In other words, CPU 101 determines whether or not the present timing is within the computation cycle. If CPU 101 determines that the computation processing should not be executed (NO in step S100), the processing in step S100 is repeated.

On the other hand, if CPU 101 determines that the computation processing should be executed (YES in step S100), CPU 101 obtains actual motor drive current value IL at this point in time (step S102). In other words, actual motor drive current value input unit 322 (FIG. 7) obtains new actual motor drive current value IL.

Then, CPU 101 obtains the relationship between the actual motor drive current and the load torque as shown in FIG. 8, based on the set motor drive pulse rate value at this point in time and set motor drive current value I0 in the previous cycle (step S104). Subsequently, CPU 101 calculates, as estimated load torque value $T\hat{}$, the load torque corresponding to actual motor drive current value IL at this point in time, by referring to the obtained relationship between the actual motor drive current and the load torque (step S106).

Then, CPU 101 calculates target load torque value T1 in the present cycle, based on estimated load torque value $T\hat{}$, target load torque value T0 in the previous cycle and target margin Mt (step S108). Subsequently, CPU 101 obtains the relationship between the pullout torque and the set motor drive current (FIG. 12) corresponding to the set motor drive pulse rate value at this point in time, based on the relationship between the pulse rates and the pullout torque (step S110). Furthermore, CPU 101 calculates set motor drive current value I1 based on target load torque value T1 in the present cycle, by referring to the relationship between the pullout torque and the set motor drive current (step S112). Finally, CPU 101 provides calculated set motor drive current value I1 to driver 210 (step S114).

Thereafter, CPU 101 determines whether or not an instruction to end this processing has been provided (step S116). If the instruction to end this processing does not have been provided (NO in step S116), the processing in step S100 and the subsequent steps is repeated. In contrast, if the instruction to end this processing has been provided (YES in step S116), the processing ends.

Modification of First Embodiment

In the above first embodiment, the feedback loop about target margin Mt is provided by paying attention to the margin of the torque as shown in the block diagram in FIG. 7.

In the block diagram shown in FIG. 7, target load torque value T1 is calculated using target load torque value T0 calculated in the previous cycle. In the course of calculation, target load torque value T0 itself is canceled, and thus, a simpler configuration can be employed.

Figure 15:
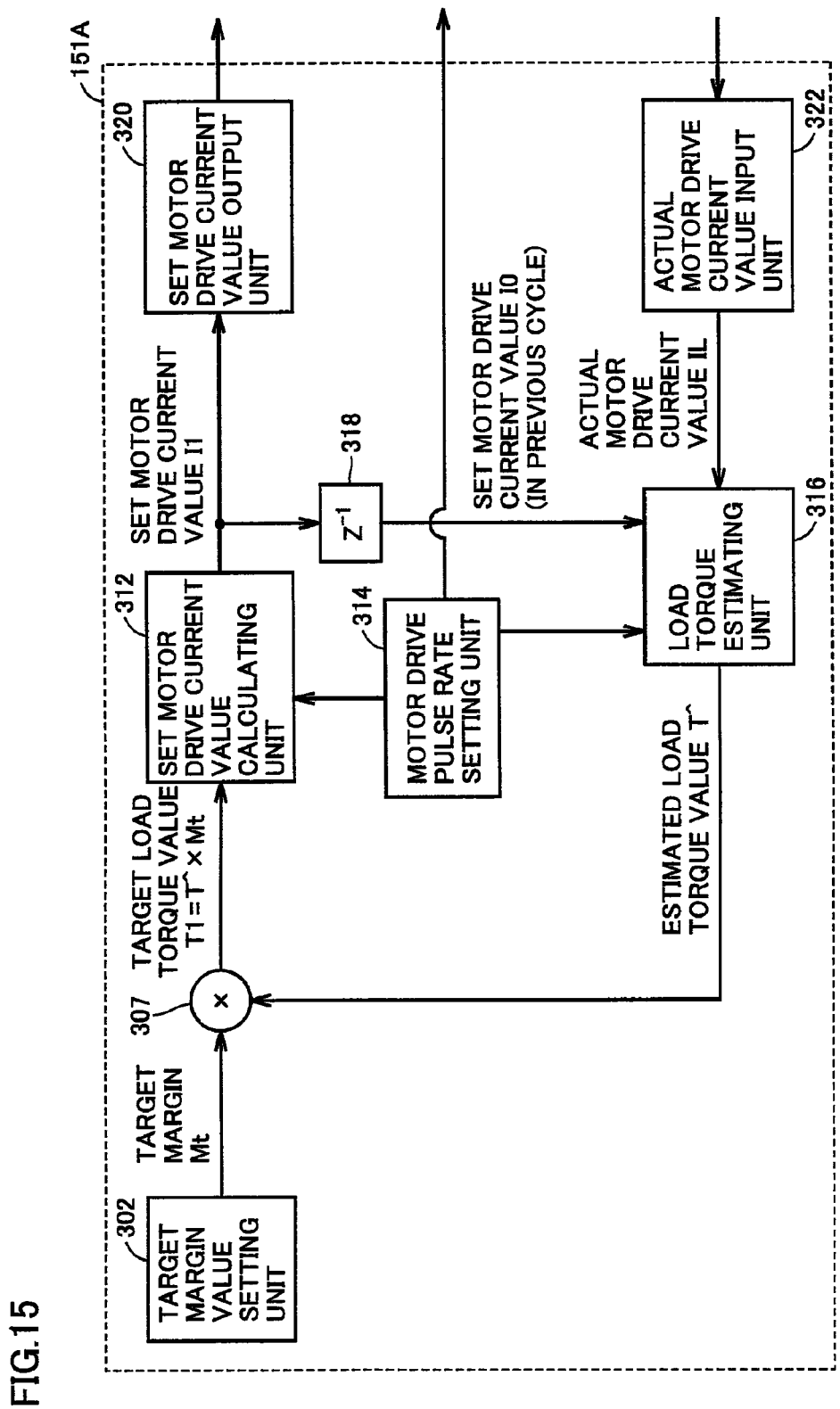
FIG. 15 is a block diagram obtained by simplifying the block diagram shown in FIG. 7.

In a block diagram shown in FIG. 15, dividing units 304 and 310, multiplying unit 306 and delay element 308 are removed and a multiplying unit 307 is provided, as compared with the block diagram shown in FIG. 7.

Multiplying unit 307 calculates target load torque value T1 in the present cycle by multiplying estimated load torque value T^ calculated by load torque estimating unit 316 by target margin Mt output from target margin value setting unit 302.

Since the processing executed by the remaining portions is similar to the processing in FIG. 7, detailed description thereof will not be repeated.

By employing the control block shown in FIG. 15, the amount of calculation required for the computation processing can be further reduced.

<Advantage>

According to the present embodiment, the load torque in the actual operating conditions of the stepping motor can be estimated in real time. Therefore, the motor drive current value can be appropriately changed and the output torque can be controlled such that the appropriate torque margin is ensured in accordance with the magnitude of the load torque.

As a result, the torque margin can be appropriately managed, and thus, excessive output torque can be suppressed and the motor drive current (consumed current) can be made appropriate. Accordingly, energy conservation, suppression of a rise in temperature, low noise, and low vibration can be achieved. In addition, since the stepping motor operates at appropriate output torque, it becomes unnecessary to employ an overdesigned stepping motor, which results in suppression of an increase in cost and also allows use of a high-performance stepping motor that is capable of high-accuracy conveyance. At the same time, by employing a stepping motor of a proper size corresponding to the load, reduction in weight, space savings and reduction in cost can also be achieved.

Furthermore, since the configuration according to the present embodiment is not a configuration in which the motor drive current is simply reduced, an increase in step-out risk due to insufficient margin can be suppressed.

Second Embodiment

In the above first embodiment, the cycle of control unit 10 must be shorter than the cycle corresponding to the cutoff frequency of LPF 222 to allow control response to load fluctuations after filtering (band limitation) by LPF 222 as shown in FIG. 5. Therefore, it is difficult to employ an inexpensive processor (CPU) because the amount of computation in control unit 10 increases relatively.

Therefore, in a second embodiment that will be described hereinafter, a configuration that allows determination of the cycle in accordance with the process of interest (in the present embodiment, paper conveyance) will be illustrated. With such a configuration, stepping motor 200 can be controlled such that the output torque becomes appropriate with respect to the actual load torque, even when control unit 10 (CPU) that cannot provide control response comparable to the control response in the above first embodiment is employed.

Figure 16:
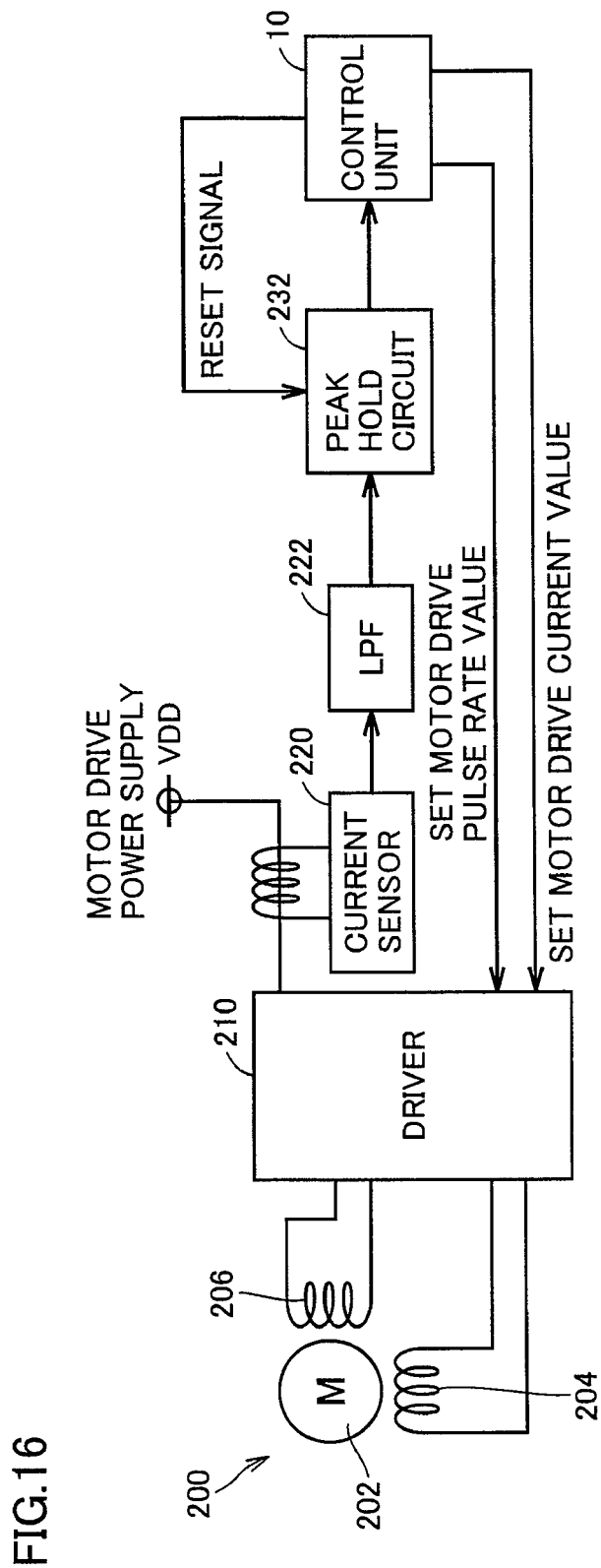
FIG. 16 shows one example of a circuit configuration for driving a stepping motor according to a second embodiment of the present invention.

FIG. 16 is a diagram showing one example of a circuit configuration for driving a stepping motor according to the second embodiment of the present invention. The circuit configuration shown in FIG. 16 differs from the circuit configuration for driving the stepping motor according to the first embodiment as shown in FIG. 5, only in that a peak hold circuit 232 is further provided between LPF 222 and control unit 10. In other words, peak hold circuit 232 is provided on the output side of current sensor 220 and LPF 222.

Peak hold circuit 232 extracts and holds a maximum value of a temporal change in output from LPF 222. In addition, the holding operation by peak hold circuit 232 is reset (cleared to zero) by a reset signal from control unit 10. Put another way, peak hold circuit 232 outputs a maximum value of outputs of LPF 222 input between a point in time when the reset signal is input from control unit 10 and the previous point in time when the reset signal is input from control unit 10. Therefore, when control unit 10 sequentially outputs the reset signal at a certain timing, the maximum value in an interval separated by adjacent reset timings is output for every interval.

In other words, the time period of the image forming processing is divided into a plurality of cycles and a representative value in each cycle having the magnitude of the current supplied from driver 210 to stepping motor 200 is obtained as the actual motor drive current value.

Figure 17:
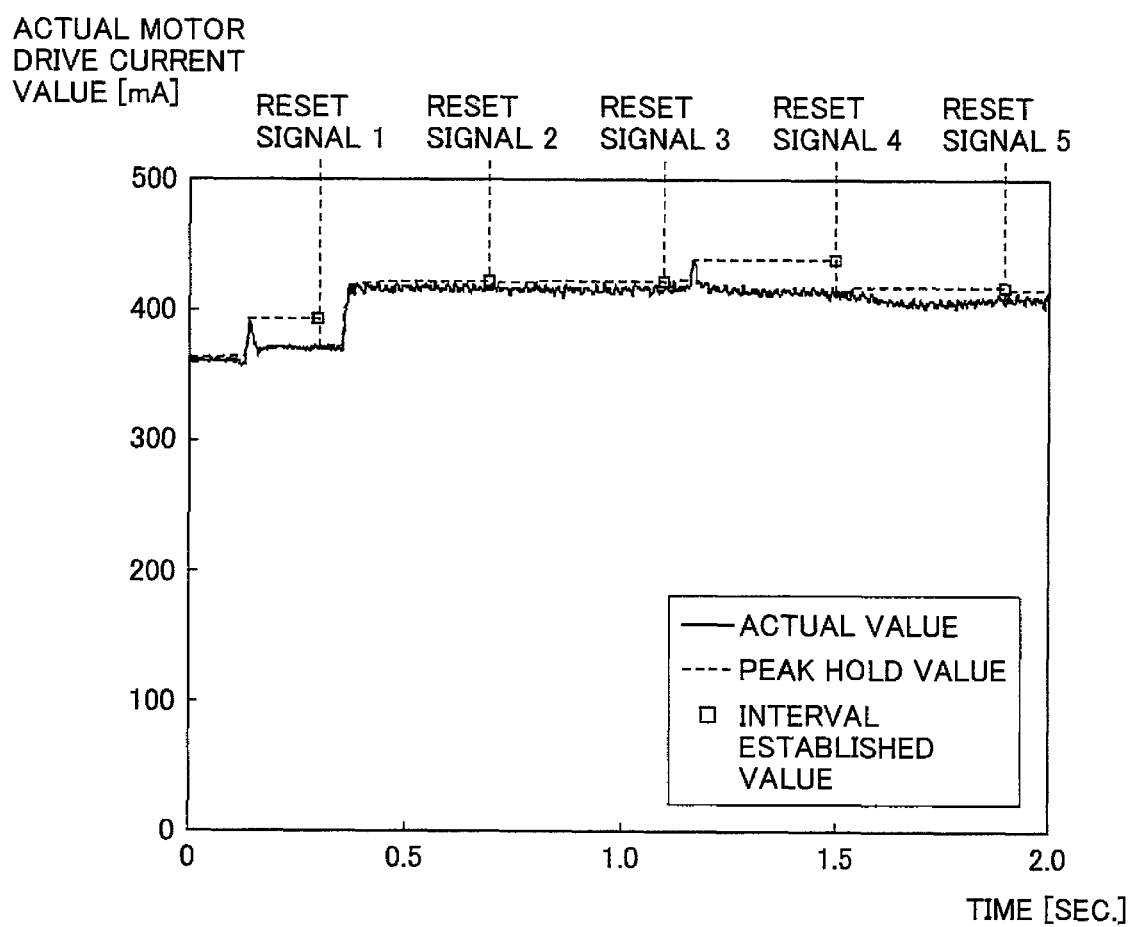
FIG. 17 shows one example of a temporal change in actual motor drive current value measured in the circuit configuration for driving the stepping motor shown in FIG. 16.

FIG. 17 shows an output waveform from peak hold circuit 232 compared with an output waveform (actual value) from LPF 222. In addition, FIG. 17 also shows an established value (value captured by control unit 10) in each interval (between adjacent two reset signals) with a square mark.

Figure 18:
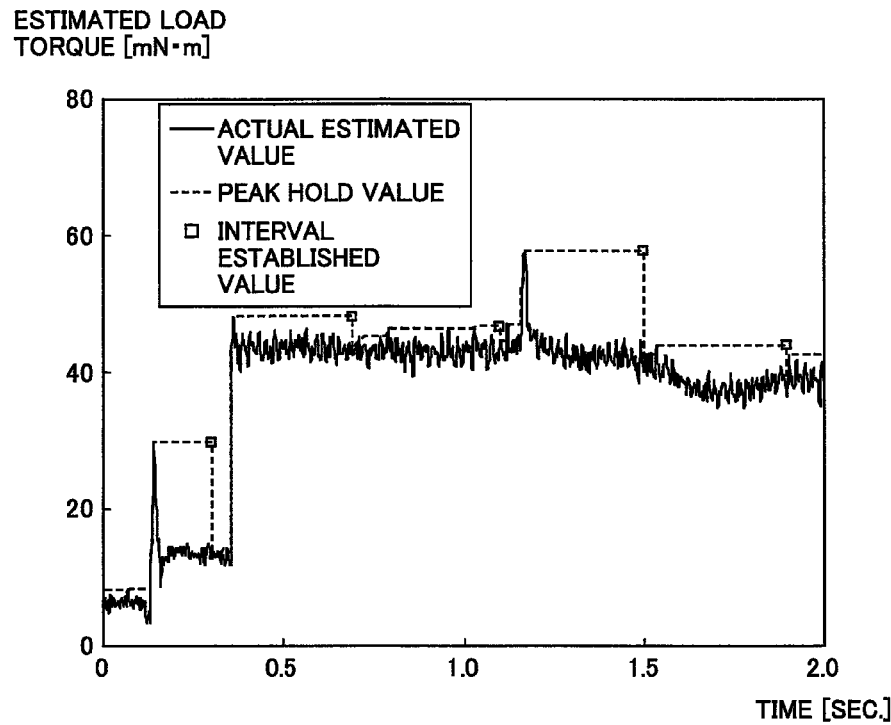
FIG. 18 shows one example of a temporal change in estimated load torque value T^ calculated from a sample value of the actual motor drive current value shown in FIG. 17.

FIG. 18 shows a value of estimated load torque value T^calculated based on the established value in each interval shown in FIG. 17, which is compared with a temporal change in estimated load torque value T^ calculated in accordance with the method as described in the above first embodiment.

The operation in an image forming apparatus according to the second embodiment of the present invention will be described with reference to FIG. 19. Control unit 10 of image forming apparatus 1 assumes one cycle of paper conveyance, which is the process of interest. This cycle will also be referred to as "paper passing cycle."

Control unit 10 first divides the paper passing cycle into appropriate intervals. In the present embodiment, the length of each interval obtained by this division corresponds to "cycle." If this time length of the interval is equal to the cycle of the processing executed by CPU 101 of control unit 10, it is not necessary to separately manage the length of each interval, which is beneficial. Alternatively, by setting each interval to an integral multiple of the cycle of the processing executed by CPU 101, the length of each interval can be managed using a relatively simple task. In addition, by using a cycle that is longer in time, less memory capacity for holding the estimated load torque value and the like that will be described later is required.

At a boundary timing of each interval, control unit 10 captures an output value (maximum value of a detected current value in the interval) from peak hold circuit 232 as an established value in the interval, and provides the reset signal to peak hold circuit 232. In other words, peak hold circuit 232 is reset at the boundary timing of each cycle. As a result, a value held by peak hold circuit 232 in the immediately preceding interval is cleared to zero.

With the configuration as described above, a temporal change in load (for example, impact load) provided to stepping motor 200 can be appropriately monitored, even in the case of control unit 10 (CPU 101) in which the speed of data capturing and the processing cycle is low.

When the method as described above is employed, however, the cycle becomes relatively long, and thus, it becomes difficult to control stepping motor 200 in real time depending on the length of the waste time of this cycle.

In paper conveyance in the image forming apparatus, papers of the same type are continuously conveyed in many cases. An example of this is the case where a plurality of copies of one document are made. Therefore, it can be considered that during paper conveyance that is continuous in time, produced load torque fluctuations have a tendency to have a strong correlation with one another.

Therefore, in the present embodiment, the estimated load torque in the paper conveyance control is calculated based on the actual motor drive current value (interval peak value) obtained in the preceding paper conveyance control (Job 1), and this calculated estimated load torque value is used in the next paper conveyance control (Job 2). In other words, a temporal change in load torque value estimated based on the actual motor drive current value obtained in the previous image forming processing is used to determine the target load torque value in each image forming processing.

Figure 19:
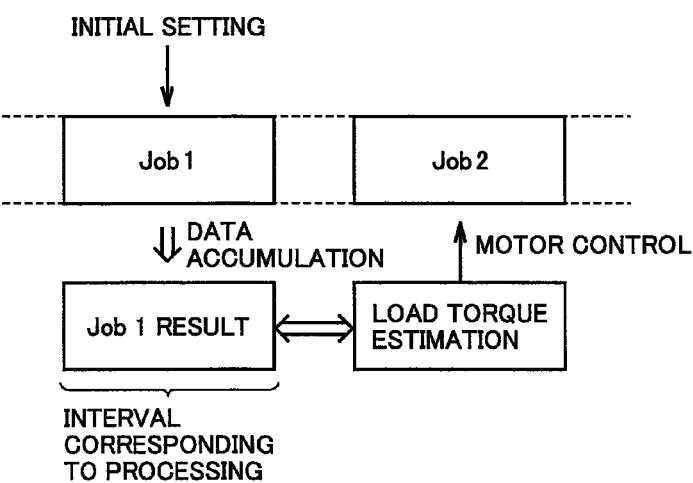
FIG. 19 is a diagram for illustrating an operation in an image forming apparatus according to the second embodiment of the present invention.

It is to be noted that as shown in FIG. 19, when the paper conveyance control is performed for the first time, there is no estimated load torque value. Therefore, the estimated load torque value corresponding to the load torque that may be produced is provided as an initial setting.

Figure 20:
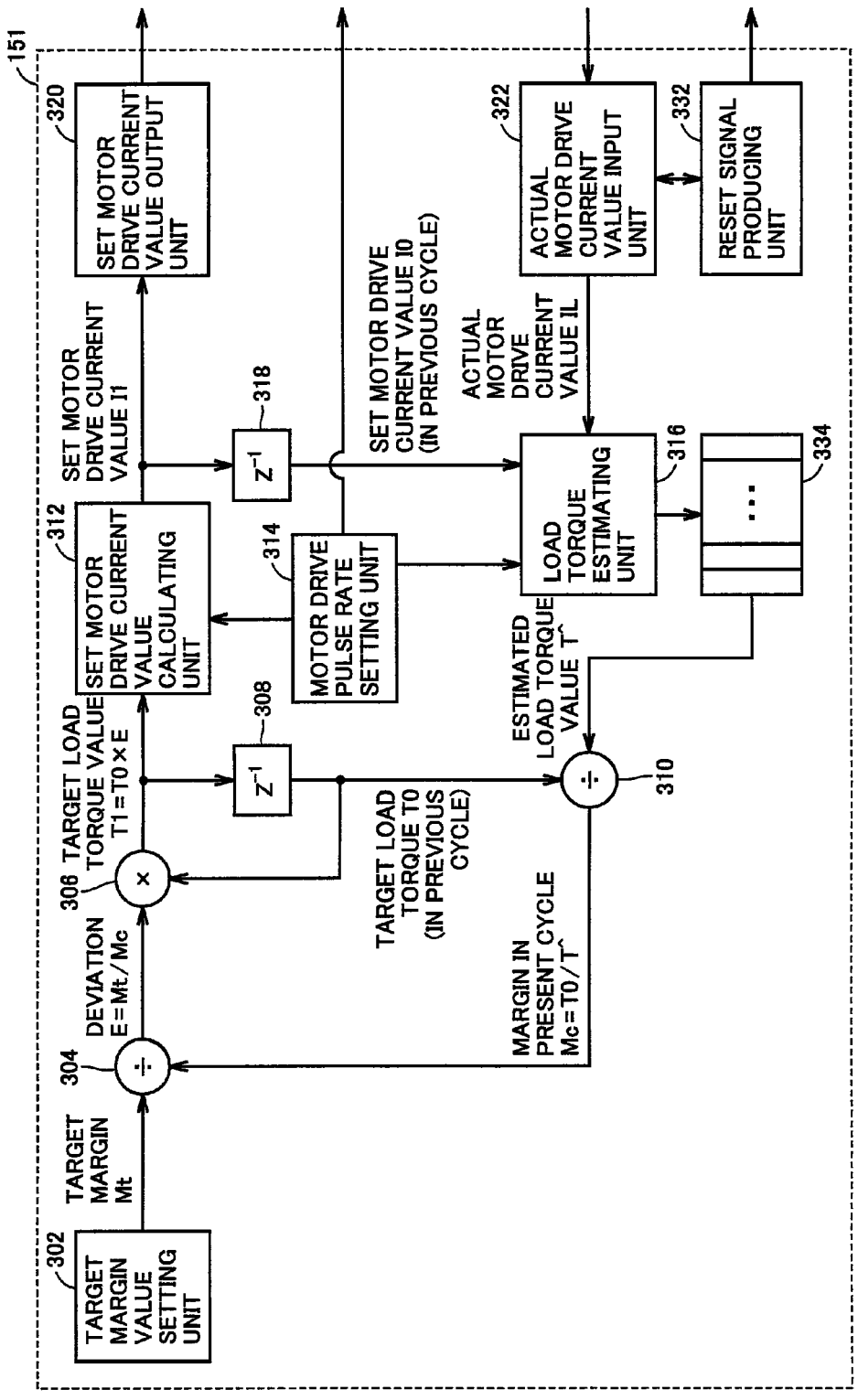
FIG. 20 is a block diagram for illustrating processing executed by a motor control module according to the second embodiment of the present invention.

Processing executed by a motor control module according to the second embodiment of the present invention will be described with reference to FIG. 20. The motor control module shown in FIG. 20 is obtained by further adding a reset signal producing unit 332 and a ring memory 334 in the motor control module shown in FIG. 7.

Reset signal producing unit 332 outputs the reset signal at a timing corresponding to the time length of the defined interval. In other words, reset signal producing unit 332 manages the interval corresponding to the paper conveyance control.

A region is allocated to ring memory 334 in correspondence with a plurality of intervals defined for paper conveyance. An address of each region is set to take a round for every paper passing cycle. Therefore, necessary data reading and writing become possible in synchronization with progress of the paper conveyance control. This ring memory 334 basically stores the calculated estimated load torque value in correspondence with each interval. In addition, in each paper conveyance control, the estimated load torque value in the corresponding interval calculated in the previous paper conveyance control is read and used.

<Flowchart>

Figure 21:
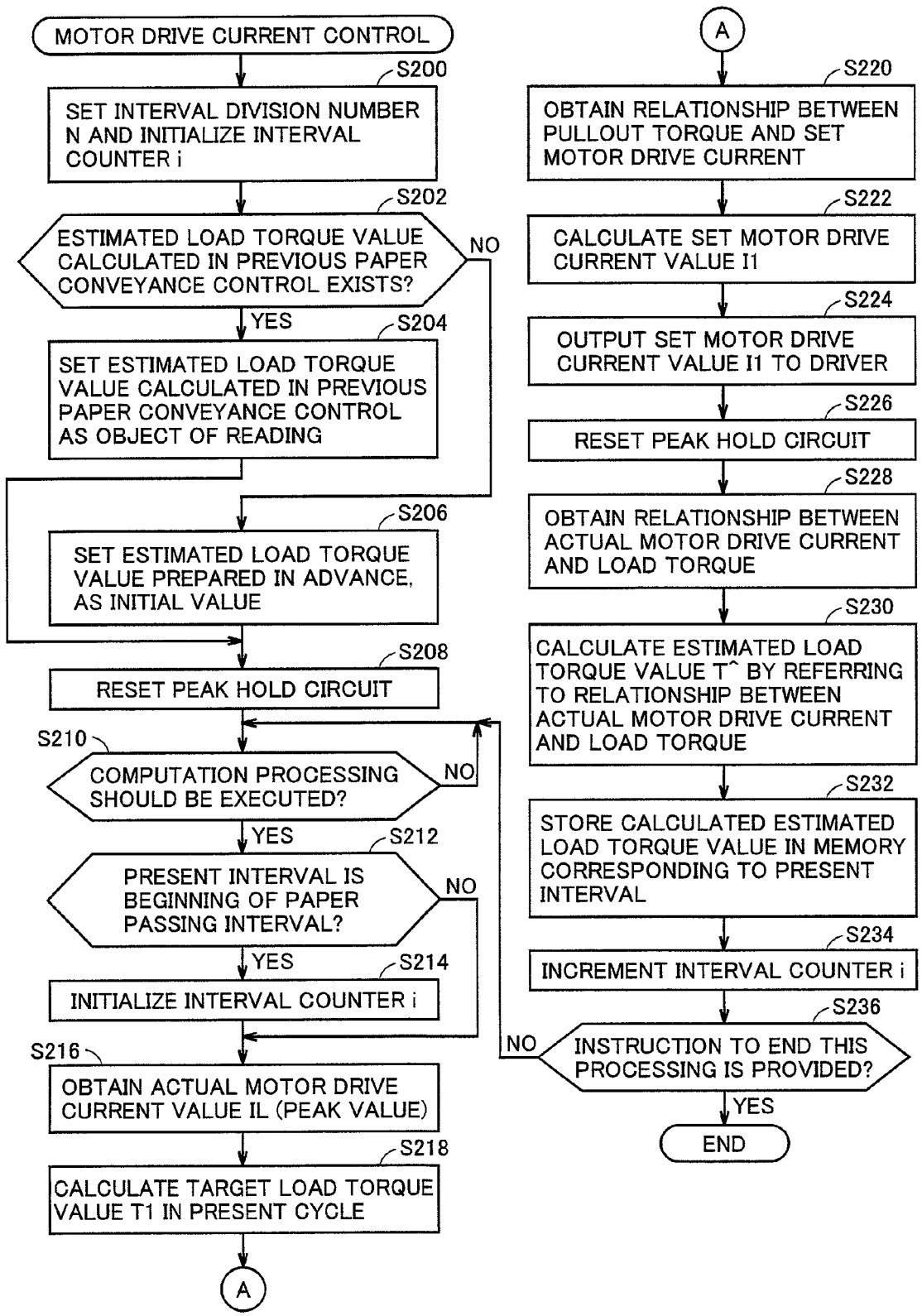
FIG. 21 is a flowchart showing processing for controlling the set motor drive current value for the stepping motor according to the second embodiment of the present invention.

A processing procedure in control unit 10 described above can be summarized in a flowchart as shown in FIG. 21. Since overall processing of the stepping motor according to the present embodiment is similar to the processing procedure in the flowchart shown in FIG. 13 described above, detailed description thereof will not be repeated.

Referring to FIG. 21, CPU 101 first sets an interval division number N in accordance with the paper passing cycle of paper conveyance and initializes an interval counter i (step S200).

Next, CPU 101 determines whether or not the estimated load torque value calculated in the previous paper conveyance control exists (step S202). In other words, CPU 101 determines whether or not ring memory 334 shown in FIG. 20 stores a result of the previous paper conveyance control.

If the estimated load torque value calculated in the previous paper conveyance control exists (YES in step S202), CPU 101 sets the estimated load torque value calculated in the previous paper conveyance control, as an object of reading (step S204).

In contrast, if the estimated load torque value calculated in the previous paper conveyance control does not exist (NO in step S202), CPU 101 sets the estimated load torque value prepared in advance, as an initial value (step S206).

Then, CPU 101 provides the reset signal to peak hold circuit 232 and resets (clears to zero) a value held by peak hold circuit 232 (step S208). Subsequently, CPU 101 determines whether or not the computation processing should be executed (step S210). In other words, CPU 101 determines whether or not the present timing is within the computation cycle. If CPU 101 determines that the computation processing should not be executed (NO in step S210), the processing in step S210 is repeated.

On the other hand, if CPU 101 determines that the computation processing should be executed (YES in step S210), CPU 101 determines whether or not the present interval is the beginning of a paper passing interval (step S212). In other words, when paper conveyance is continuously performed, it is determined whether or not a timing at which the preceding paper conveyance is completed and the next paper conveyance starts has come.

If CPU 101 determines that the present interval is the beginning of the paper passing interval (YES in step S212), CPU 101 initializes interval counter i (step S214). Then, the processing proceeds to step S216.

On the other hand, if CPU 101 does not determine that the present interval is the beginning of the paper passing interval (NO in step S212), the processing in step S214 is skipped.

Then, CPU 101 obtains actual motor drive current value IL (peak value) at this point in time (step S216). In other words, actual motor drive current value input unit 322 (FIG. 20) obtains new actual motor drive current value IL. Subsequently, CPU 101 calculates target load torque value T1 in the present cycle based on a value of the interval corresponding to the present interval, of a series of estimated load torque value calculated in the previous paper conveyance control, target load torque value T0 in the previous cycle and target margin Mt (step S218). Subsequently, CPU 101 obtains the relationship between the pullout torque and the set motor drive current (FIG. 12) corresponding to the set motor drive pulse rate value at this point in time, based on the relationship between the pulse rates and the pullout torque (step S220). Furthermore, CPU 101 calculates set motor drive current value I1 based on target load torque value T1 in the present cycle, by referring to the relationship between the pullout torque and the set motor drive current (step S222). Finally, CPU 101 provides calculated set motor drive current value I1 to driver 210 (step S224).

Thereafter, CPU 101 provides the reset signal to peak hold circuit 232 and resets (clears to zero) the value held by peak hold circuit 232 (step S226).

Subsequently, CPU 101 executes processing of estimating the load torque value as will be described hereinafter. In other words, CPU 101 obtains the relationship between the actual motor drive current and the load torque as shown in FIG. 8, based on the set motor drive pulse rate value at this point in time and set motor drive current value I0 in the previous cycle (before reset in step S226) (step S228). Subsequently, CPU 101 calculates, as estimated load torque value T^, the load torque corresponding to actual motor drive current value IL (peak value) obtained in step S216, by referring to the obtained relationship between the actual motor drive current and the load torque (step S230). Then, CPU 101 stores calculated estimated load torque value T^ in a memory corresponding to the present interval, as new estimated load torque value T^ (step S232). In other words, CPU 101 updates a value of the region of ring memory 334 shown in FIG. 20 that corresponds to interval counter i, to a value of estimated load torque value T^ calculated in step S230. Then, CPU 101 increments interval counter i (step S234).

Thereafter, CPU 101 determines whether or not an instruction to end this processing has been provided (step S236). If the instruction to end this processing does not have been provided (NO in step S236), the processing in step S210 and the subsequent steps is repeated. In contrast, if the instruction to end this processing has been provided (YES in step S236), the processing ends.

<Other Configuration>

Although the reset cycle, that is, the computation cycle of peak hold circuit 232 may be fixed, a timing at which load fluctuations do not easily occur may be dynamically determined such that even when instantaneous load fluctuations occur at the time of reset of peak hold circuit 232, a value thereof can be appropriately detected. Specifically, the reset timing may be changed so as not to be included in the time period for which occurrence of transient load fluctuations is anticipated, such as the moment in time at which a paper enters the roller. Alternatively, the positions of division into the intervals may be misaligned each other in continuous paper conveyance. In this case, the estimated load torque value may be calculated by integrating results calculated in a plurality of times of paper conveyance.

In addition, in the above embodiment, the configuration has been illustrated, in which the estimated load torque value calculated in the previous paper conveyance is used as it is. The estimated load torque value used for control may, however, be determined using statistical processing (such as simple averaging and weighted averaging) of a plurality of estimated load torque value calculated in the plurality of times of paper conveyance. In other words, by the statistical processing of temporal changes in plurality of load torque values estimated in the plurality of times of the previous image forming processing, a temporal change in estimated load torque value in the present image forming processing is determined.

When execution of continuous paper conveyance is requested, target margin Mt may be set to a relatively high value in conveyance of a first paper and target margin Mt may be gradually decreased to a proper level depending on the situation in subsequent paper conveyance.

Modification of Second Embodiment

Furthermore, a plurality of peak hold circuits having different reset timings may be provided to be capable of precisely detecting instantaneous load fluctuations even when the fluctuations occur at the reset timing.

Figure 22:
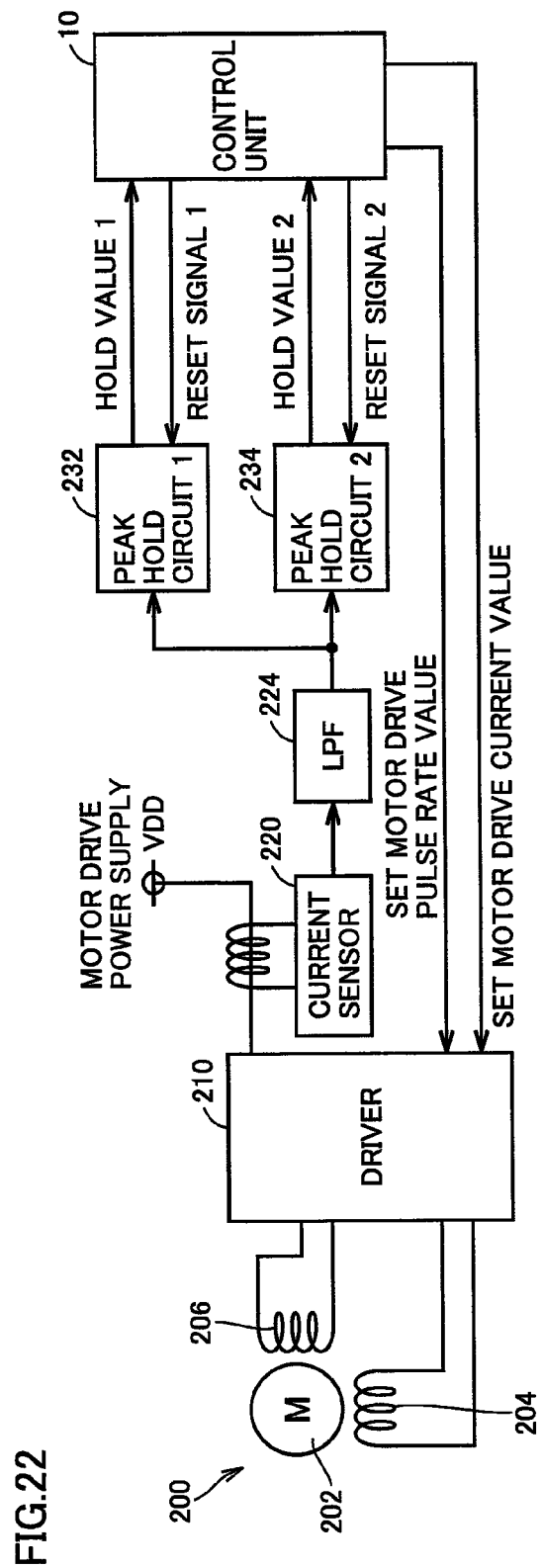
FIG. 22 shows one example of a circuit configuration for driving a stepping motor according to a modification of the second embodiment of the present invention.

FIG. 22 is a diagram showing one example of a circuit configuration for driving a stepping motor according to a modification of the second embodiment of the present invention. The circuit configuration shown in FIG. 22 differs from the circuit configuration for driving the stepping motor according to the second embodiment shown in FIG. 16, only in that a peak hold circuit 234 is further provided between LPF 222 and control unit 10.

Reset signals 1 and 2 are provided from control unit 10 to peak hold circuits 232 and 234 at different timings, respectively. By employing the plurality of peak hold circuits having different reset timings as described above, instantaneous load fluctuations can be appropriately detected even when the fluctuations occur at the actual motor drive current value.

When a configuration in which the reset signal is output from control unit 10 through output port 117 is employed, two A/D converters are required. Therefore, for the purpose of simplifying the configuration, a multiplexer provided separately from control unit 10 may be used to selectively provide the reset signals to peak hold circuits 232 and 234, respectively.

Figure 23:
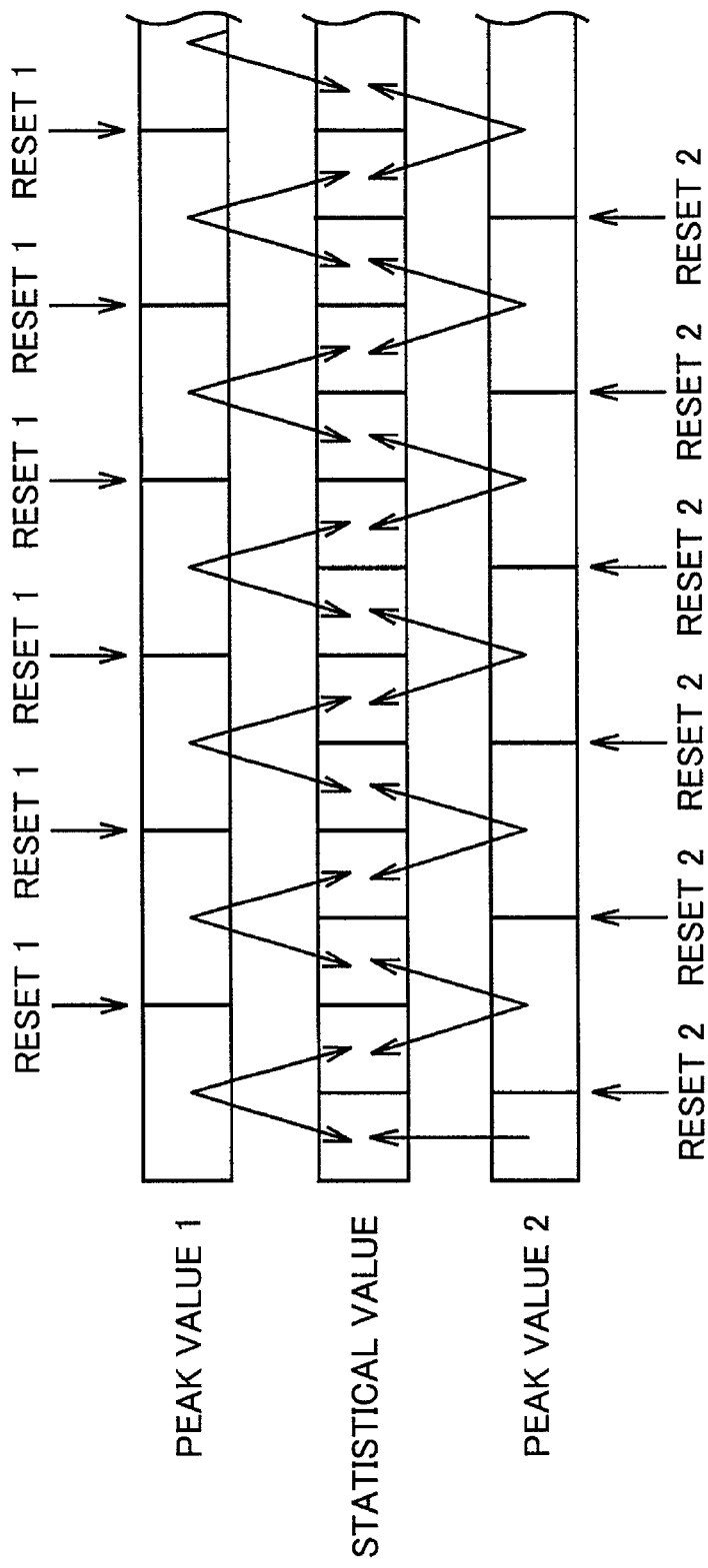
FIG. 23 is a diagram for illustrating processing of calculating the actual motor drive current value according to the modification of the second embodiment of the present invention.

As described above, by providing different reset timings to the plurality of peak hold circuits, peak values thereof are updated at different timings. Therefore, a final actual motor drive current value may be calculated in accordance with a method as shown in FIG. 23, for example.

Processing of calculating the actual motor drive current value according to the modification of the second embodiment of the present invention will be described with reference to FIG. 23. A statistical value may be calculated for every interval shorter than the intervals of peak hold circuits 232 and 234, by reflecting a plurality of values that are adjacent in time, of the actual motor drive current values (peak values) output from peak hold circuits 232 and 234, respectively. In this case, simple averaging, weighted averaging, or the statistical processing of the maximum value and the like can be employed.

<Advantage>

According to the present embodiment, even when an inexpensive control device (CPU) having relatively low data processing capability is employed, the advantages similar to those in the above first embodiment can be achieved.

Other Embodiments

A program for performing the control as described in the above embodiments can also be provided in an arbitrary manner. Such a program can also be provided with the program recorded in a non-transitory and computer-readable recording medium such as a flexible disk, a CD-ROM (Compact Disk-Read Only Memory), an ROM (Read Only Memory), an RAM (Random Access Memory), and a memory card. Alternatively, the program can also be provided by download over the network.

Such a program may be such that a necessary module of program modules provided as a part of the operating system (OS) of a computer is called in a predetermined array and at a predetermined timing, and executes the processing. In this case, the program itself does not include the above module and the processing is executed in cooperation with the OS. The program according to the present embodiment may also include such a program that does not include the module.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus, comprising:
   a stepping motor arranged in a conveying path for a paper on which an image is formed;
   a driver for driving the stepping motor;
   a current detecting unit for detecting an actual current value that is magnitude of a current at the driver for driving the stepping motor; and
   a control unit for providing, to the driver, a set current value for setting magnitude of a current to be supplied to the stepping motor, for every predetermined cycle, based on the actual current value, wherein
   the control unit includes
      a first determining portion for determining, as an estimated load torque value, a load torque value corresponding to the set current value in a previous cycle and the actual current value in a present cycle, by referring to a relationship between actual current and load torque of the stepping motor with respect to the set current value,
      a second determining portion for determining a target load torque value that indicates torque to be output by the stepping motor, based on the estimated load torque value, and
      a third determining portion for determining, as the set current value, a current value corresponding to the target load torque value, by referring to a relationship between maximum output torque of the stepping motor and current supplied to the stepping motor.

2. The image forming apparatus according to claim 1, wherein
   the second determining portion is adapted to determine the target load torque value such that a ratio of the target load torque value to the estimated load torque value exceeds 1.

3. The image forming apparatus according to claim 2, wherein
   the second determining portion is adapted to set the ratio of the target load torque value to the estimated load torque value to be large in advance in continuous image forming processing and then to reduce the ratio as image forming processing proceeds.

4. The image forming apparatus according to claim 1, wherein
   the control unit further includes a changing portion for changing a set value of a rotation speed of the stepping motor, in accordance with progress of image forming processing.

5. The image forming apparatus according to claim 4, wherein
   the control unit further includes an obtaining portion for dividing a time period of the image forming processing into a plurality of cycles and obtaining, as the actual current value, a representative value in each cycle from among a plurality of the current values at the driver for driving the stepping motor.

6. The image forming apparatus according to claim 5, wherein
   the control unit is adapted to use a temporal change in load torque estimated based on the actual current value obtained in previous image forming processing, to determine the target load torque value in each image forming processing.

7. The image forming apparatus according to claim 6, wherein
   the control unit further includes a fourth determining portion for determining the temporal change in the estimated load torque in each image forming processing by statistical processing of temporal changes in a plurality of load torque that are estimated in a plurality of times of previous image forming processing.

8. The image forming apparatus according to claim 5, further comprising
   at least one peak hold circuit provided on an output side of the current detecting unit, wherein
   the control unit is adapted to output a reset signal to the peak hold circuit at a boundary timing of each cycle.

9. The image forming apparatus according to claim 1, wherein
   the control unit further includes
      a storage unit for storing a plurality of relationships between the actual current and the output torque of the stepping motor for a plurality of the set current values of different magnitude, and
      a fifth determining portion for determining a relationship between the actual current and the output torque of the stepping motor with respect to the set current value in the previous cycle, using two or more the relationships related to the set current value in the previous cycle, of the plurality of relationships between the actual current and the output torque of the stepping motor.

10. The image forming apparatus according to claim 1, wherein
    the control unit further includes
       a providing portion for providing a set value of a rotation speed of the stepping motor to the driver,
       a storage unit for storing a plurality of relationships between the rotation speed of the stepping motor and the maximum output torque of the stepping motor for a plurality of the set current values of different magnitude, and
       a sixth determining portion for determining the relationship between the maximum output torque of the stepping motor and the current supplied to the stepping motor with respect to the set value of the rotation speed provided to the stepping motor, by obtaining the maximum output torque of the stepping motor corresponding to the set value of the rotation speed provided to the stepping motor, based on the plurality of relationships between the rotation speed of the stepping motor and the maximum output torque of the stepping motor.

11. The image forming apparatus according to claim 1, wherein
    the current detecting unit includes a low pass filter for filtering a high-frequency component included in a raw detected current.

12. An image forming apparatus, comprising:
    a stepping motor;
    a driver for driving the stepping motor;
    a current detecting unit for detecting an actual current value that is magnitude of a current at the driver for driving the stepping motor; and
    a control unit for providing, to the driver, a set current value for setting magnitude of a current to be supplied to the stepping motor, for every predetermined cycle, based on the actual current value, wherein
    the control unit includes
       a first determining portion for determining, as an estimated load torque value, a load torque value corresponding to the set current value in a previous cycle and the actual current value in a present cycle, by referring to a relationship between actual current and load torque of the stepping motor with respect to the set current value, a second determining portion for determining a target load torque value that indicates torque to be output by the stepping motor, based on the estimated load torque value, and a third determining portion for determining, as the set current value, a current value corresponding to the target load torque value, by referring to a relationship between maximum output torque of the stepping motor and current supplied to the stepping motor.

13. The image forming apparatus according to claim 12, wherein the control unit further includes a storage unit for storing a plurality of relationships between the actual current and the output torque of the stepping motor for a plurality of the set current values of different magnitude, and a fourth determining portion for determining a relationship between the actual current and the output torque of the stepping motor with respect to the set current value in the previous cycle, using two or more the relationships related to the set current value in the previous cycle, of the plurality of relationships between the actual current and the output torque of the stepping motor.

14. The image forming apparatus according to claim 12, wherein the control unit further includes a providing portion for providing a set value of a rotation speed of the stepping motor to the driver, a storage unit for storing a plurality of relationships between the rotation speed of the stepping motor and the maximum output torque of the stepping motor for a plurality of the set current values of different magnitude, and a fifth determining portion for determining the relationship between the maximum output torque of the stepping motor and the current supplied to the stepping motor with respect to the set value of the rotation speed provided to the stepping motor, by obtaining the maximum output torque of the stepping motor corresponding to the set value of the rotation speed provided to the stepping motor, based on the plurality of relationships between the rotation speed of the stepping motor and the maximum output torque of the stepping motor.

15. The image forming apparatus according to claim 12, wherein the current detecting unit includes a low pass filter for filtering a high-frequency component included in a raw detected current.

16. The image forming apparatus according to claim 12, wherein the second determining portion is adapted to determine the target load torque value such that a ratio of the target load torque value to the estimated load torque value exceeds 1.

17. The image forming apparatus according to claim 16, wherein the second determining portion is adapted to set the ratio of the target load torque value to the estimated load torque value to be large in advance in continuous image forming processing and then to reduce the ratio as image forming processing proceeds.

18. The image forming apparatus according to claim 12, wherein the stepping motor is arranged in a conveying path for a paper on which an image is formed, and the control unit further includes a changing portion for changing a set value of a rotation speed of the stepping motor, in accordance with progress of image forming processing.

19. The image forming apparatus according to claim 18, wherein the control unit further includes an obtaining portion for dividing a time period of the image forming processing into a plurality of cycles and obtaining, as the actual current value, a representative value in each cycle from among a plurality of the current values at the driver for driving the stepping motor.

20. The image forming apparatus according to claim 19, wherein the control unit is adapted to use a temporal change in load torque estimated based on the actual current value obtained in previous image forming processing, to determine the target load torque value in each image forming processing.

21. The image forming apparatus according to claim 20, wherein the control unit further includes a sixth determining portion for determining the temporal change in the estimated load torque in each image forming processing by statistical processing of temporal changes in a plurality of load torque that are estimated in a plurality of times of previous image forming processing.

22. The image forming apparatus according to claim 19, further comprising at least one peak hold circuit provided on an output side of the current detecting unit, wherein the control unit is adapted to output a reset signal to the peak hold circuit at a boundary timing of each cycle.

23. A method for controlling a stepping motor in an image forming apparatus, comprising the steps of:

detecting an actual current value that is magnitude of a current at a driver for driving the stepping motor; and providing, to the driver, a set current value for setting magnitude of a current to be supplied to the stepping motor, for every predetermined cycle, based on the detected actual current value, wherein the step of providing the set current value for every predetermined cycle includes the steps of determining, as an estimated load torque value, a load torque value corresponding to the set current value in a previous cycle and the actual current value in a present cycle, by referring to a relationship between actual current and load torque of the stepping motor with respect to the set current value, determining a target load torque value that indicates torque to be output by the stepping motor, based on the estimated load torque value, and determining, as the set current value, a current value corresponding to the target load torque value, by referring to a relationship between maximum output torque of the stepping motor and current supplied to the stepping motor.

* * * * *